United States Patent [19]
Feldpausch et al.

[11] Patent Number: 5,943,833
[45] Date of Patent: Aug. 31, 1999

[54] IN-FLOOR UTILITY OUTLET

[75] Inventors: Thomas G. Feldpausch, Hastings; Carl V. Forslund, III, East Grand Rapids; Joseph Chang, Grand Rapids, all of Mich.

[73] Assignee: Steelcase Inc., Grand Rapids, Mich.

[21] Appl. No.: 08/813,004

[22] Filed: Mar. 4, 1997

Related U.S. Application Data

[63] Continuation-in-part of application No. 08/536,061, Sep. 29, 1995, abandoned.

[51] Int. Cl.$^6$ .............................. E04C 2/52; H02G 3/12
[52] U.S. Cl. .......................... 52/220.5; 174/53; 174/58; 174/67
[58] Field of Search .................... 52/220.5, 220.1; 174/66, 67, 53, 58

[56] References Cited

U.S. PATENT DOCUMENTS

| | | | |
|---|---|---|---|
| 3,701,837 | 10/1972 | Fork | 174/50 |
| 4,178,469 | 12/1979 | Fork | 174/48 |
| 4,237,666 | 12/1980 | Kohaut | 52/221 |
| 4,408,090 | 10/1983 | Kohaut | 174/48 |
| 4,454,692 | 6/1984 | Ault | 52/221 |
| 4,507,900 | 4/1985 | Landis | 52/221 |
| 4,536,612 | 8/1985 | Domigan | 174/48 |
| 4,593,506 | 6/1986 | Hartman et al. | 52/221 |
| 4,593,507 | 6/1986 | Hartman | 52/221 |
| 4,656,798 | 4/1987 | Hazen | 52/221 |
| 4,721,476 | 1/1988 | Zeliff et al. | 439/142 |
| 4,781,001 | 11/1988 | Ryan | 52/220 |
| 4,922,668 | 5/1990 | Payne | 52/221 |
| 4,967,041 | 10/1990 | Bowman | 174/48 |
| 5,008,491 | 4/1991 | Bowman | 174/48 |
| 5,057,647 | 10/1991 | Bogden et al. | 174/48 |
| 5,263,289 | 11/1993 | Boyd | 52/220.2 |

FOREIGN PATENT DOCUMENTS 591615 1/1960 Canada ................. 52/220.5

OTHER PUBLICATIONS

AMP Catalog 82164 by AMP Incorporated, Harrisburg, Pennsylvania, pp. 100–101 and 182–183, Dated Jan. 1993.

*Primary Examiner*—Michael Safavi
*Attorney, Agent, or Firm*—Price, Heneveld, Cooper, DeWitt and Litton

[57] ABSTRACT

An in-floor utility outlet for raised floor constructions and the like includes a base having a sidewall with a generally closed plan shape, and at least one opening or port to mount a utility outlet therein. A cover plate with a central aperture therethrough extends over the base sidewall to enclose utility lines associated with the outlet. An access cover is received in the central aperture of the cover plate flush with the same, and includes at least one aperture through which utility tap-in lines can be routed below the floor surface for connection with the utility outlets. A floor pan below the raised floor supports the base and the cover plate.

42 Claims, 25 Drawing Sheets

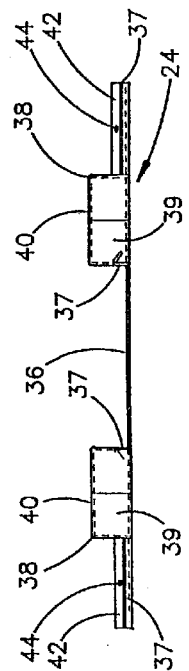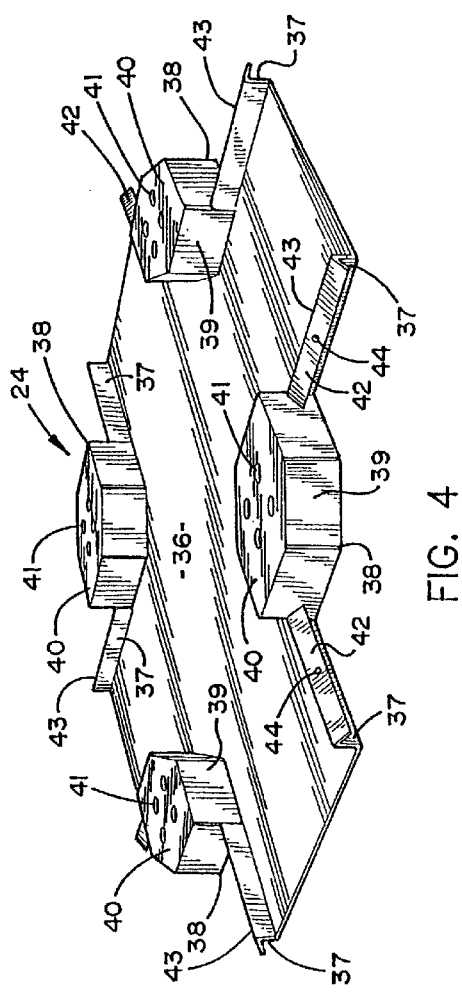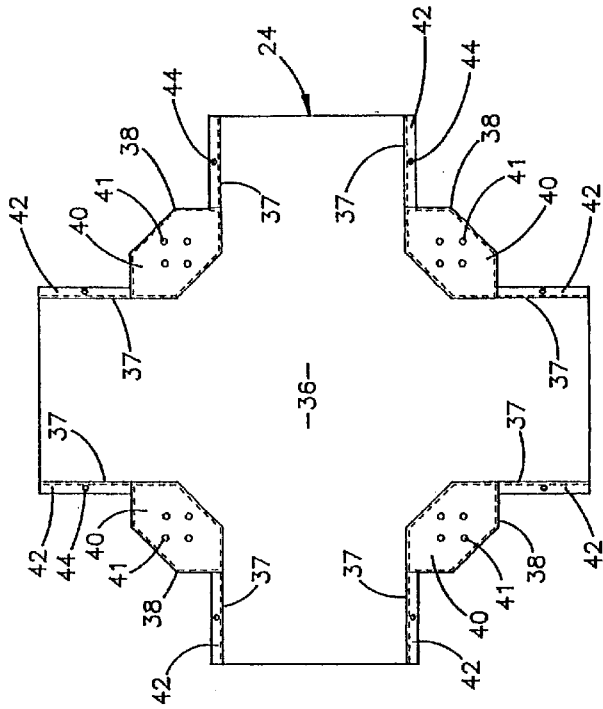

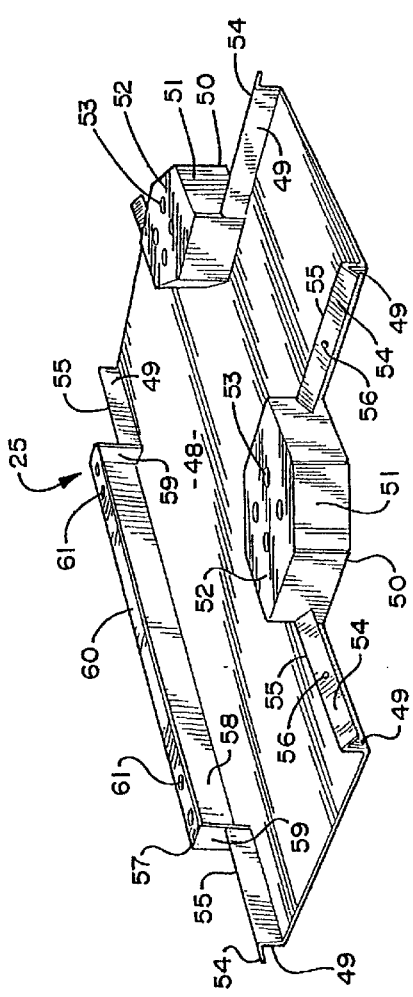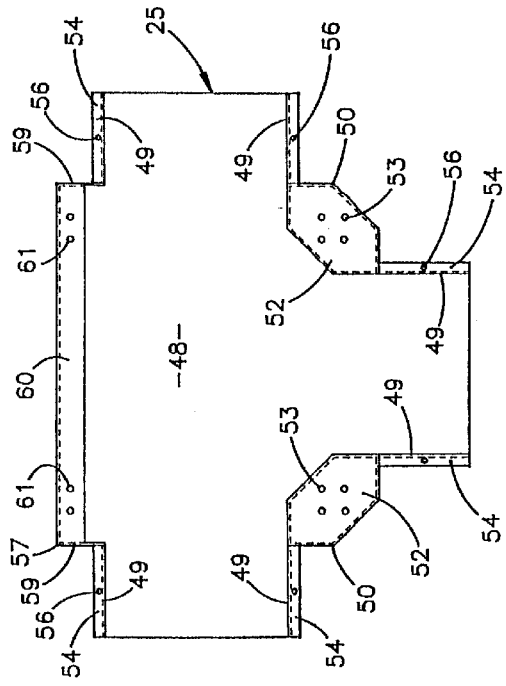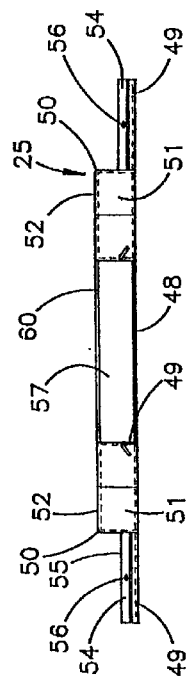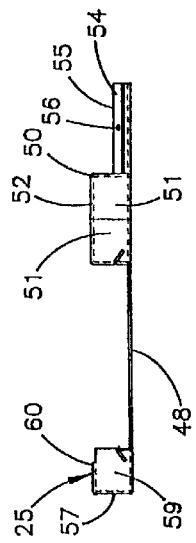

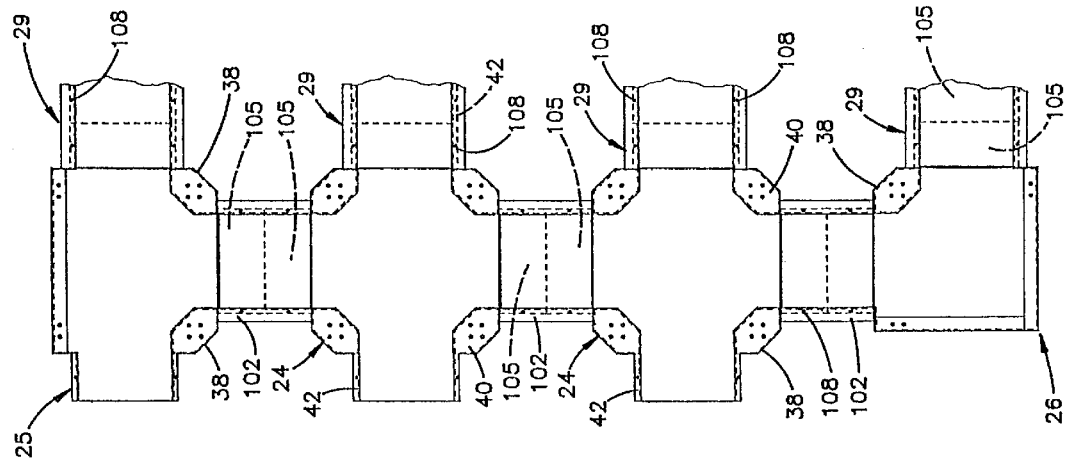
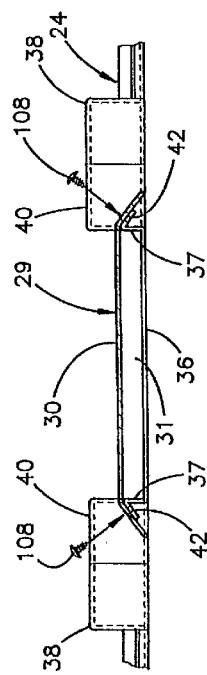
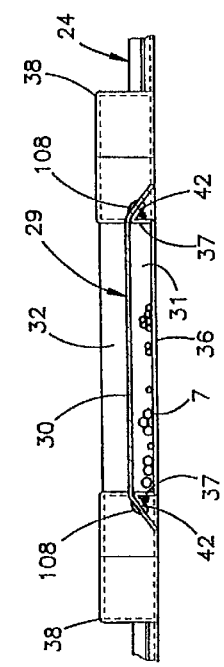
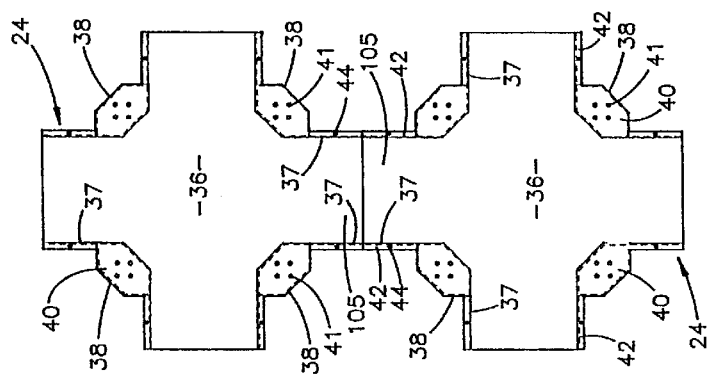
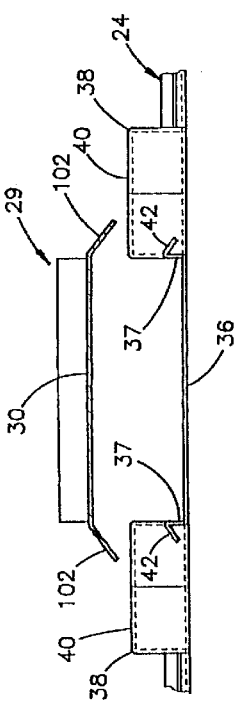

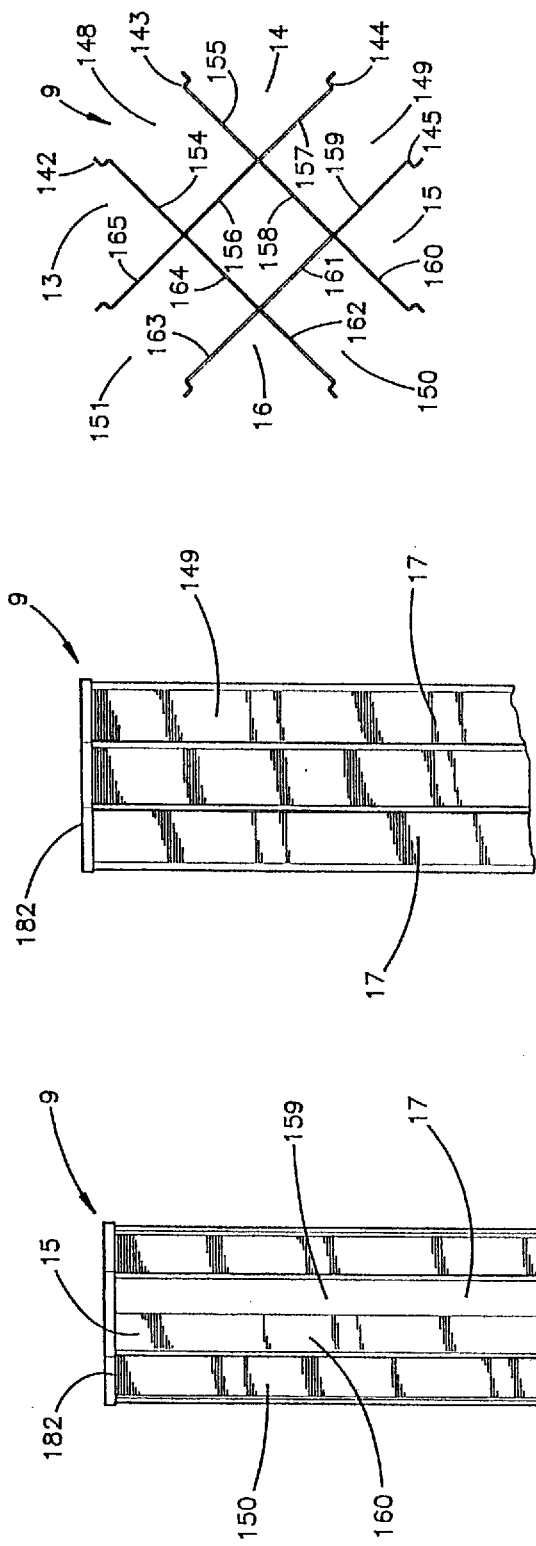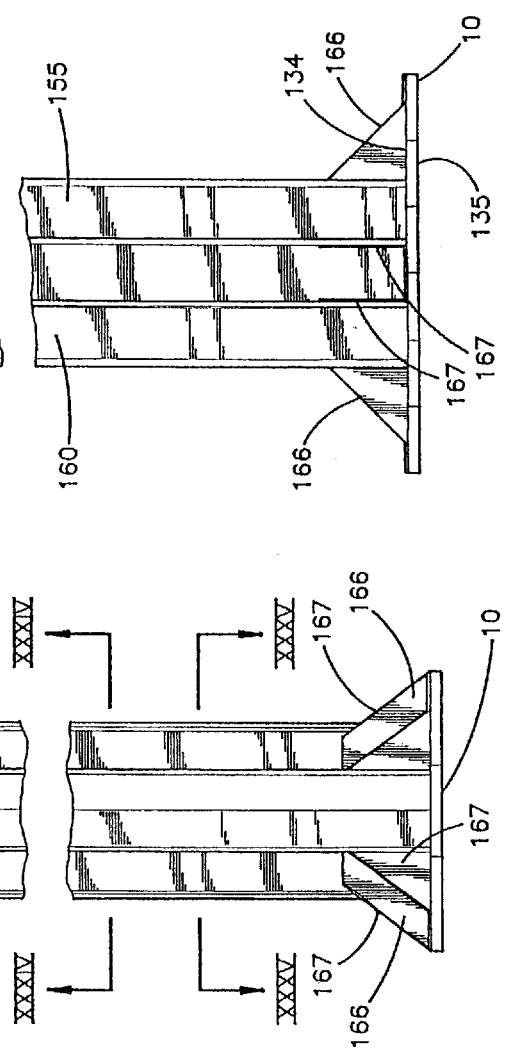

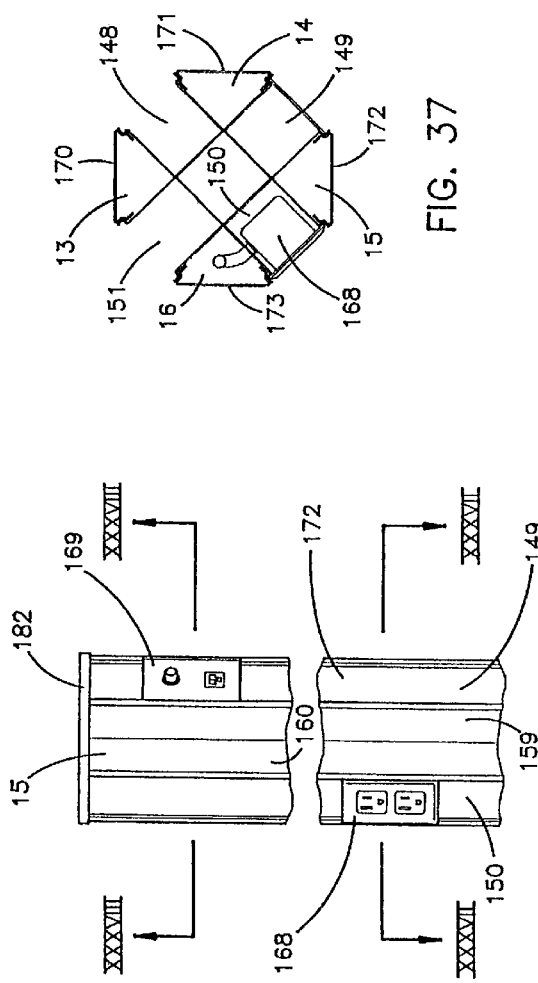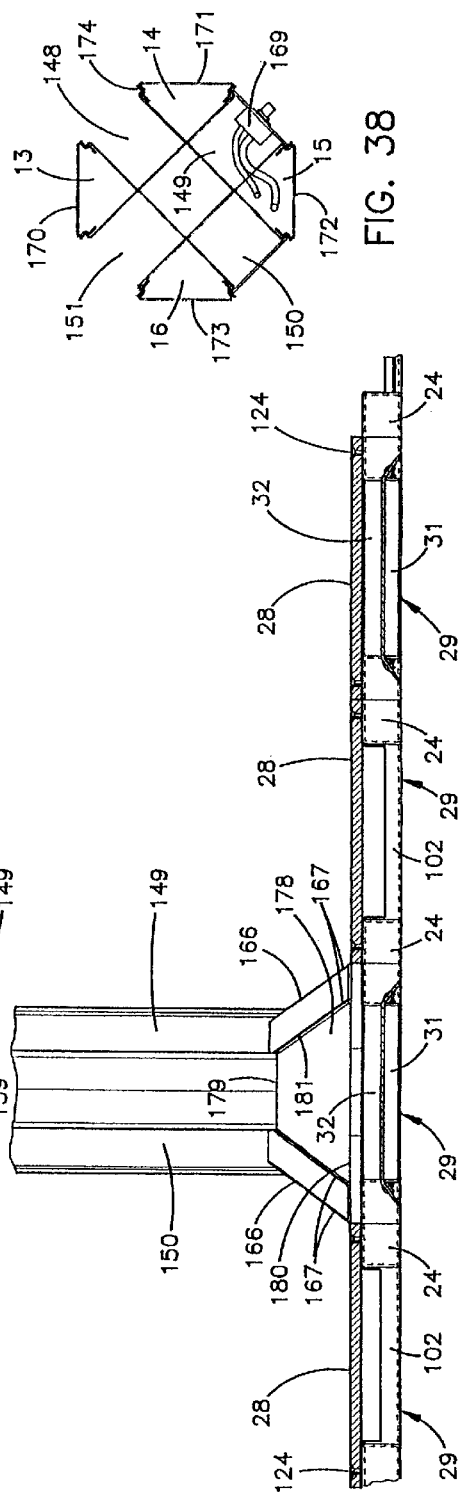

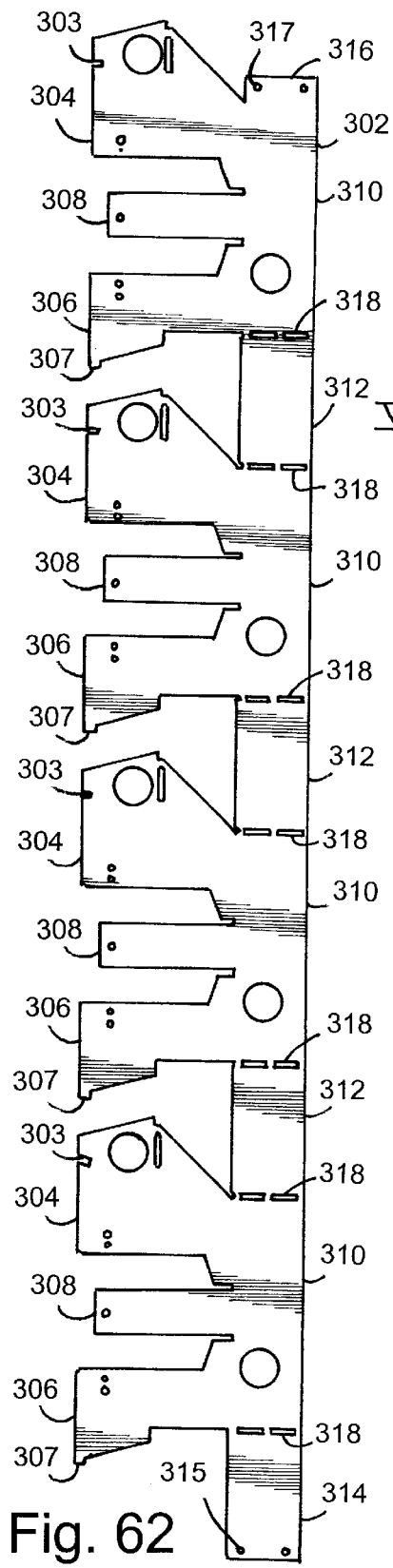
Fig. 62
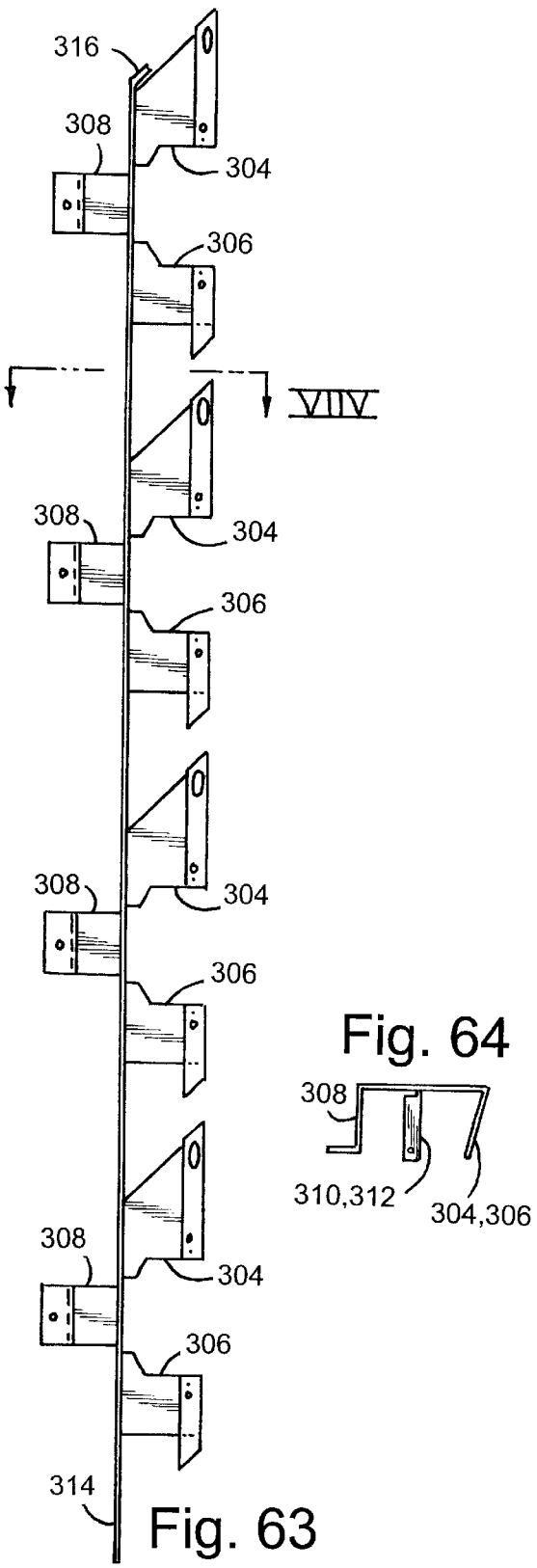
Fig. 63
Fig. 64

IN-FLOOR UTILITY OUTLET

CROSS-REFERENCE TO RELATED APPLICATION

The present application is continuation-in-part of commonly assigned, co-pending U.S. patent application Ser. No. 08/536,061, filed Sep. 29, 1995, now abandoned, which is hereby incorporated herein by reference.

BACKGROUND OF INVENTION

The present invention relates to the distribution of utilities in open office plans and the like, and in particular to a prefabricated floor construction and utility post arrangement.

Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall office costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces into individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

SUMMARY OF INVENTION

One aspect of the present invention is an in-floor utility outlet for raised floor construction and the like of the type having an elevated floor surface below which utilities can be routed. A base is positioned in the raised floor construction generally below the floor surface, and has a sidewall with a generally closed plan shape, and at least one opening or port shaped to mount an associated utility outlet therein. A cover plate is mounted on the raised floor construction, and forms a portion of the raised floor surface. The cover plate includes a central aperture therethrough, and extends over the base sidewall to enclose utility lines associated with the utility outlet. An access cover is received in the central aperture of the cover plate, and is retained in a generally flush orientation with the cover plate to form a portion of the floor surface. The access cover includes at least one aperture through which utility tap-in lines can be routed below the floor surface for connection with the utility outlets.

The principal objects of the present invention are to provide an in-floor outlet for utility distribution systems in open office plans, and other similar environments. The utility distribution system includes a prefabricated floor construction which is adapted to route multiple utilities therethrough, and is also capable of separating at least two different types of utilities to avoid interference between the same. The in-floor outlet is easy to both install and relocate, and provides ready access to multiple utility outlets of different types in a very compact design. The utility outlets are positioned safely below the raised floor surface; and are generally non-obtrusive to the planned esthetics of the space. The present utility distribution system is very versatile, adaptable, efficient in use, capable of a long operating life, and particularly well adapted for the proposed use.

A floor pan is supported on a surface below the raised floor structure and has a central plate for receiving the base. The floor pan also has upstanding pedestals supporting the cover plate.

These and other advantages of the invention will be further understood and appreciated by those skilled in the art by reference to the following written specification, claims, and appended drawings.

BRIEF DESCRIPTION OF THE DRAWINGS

FIG. 4 is a perspective view of an X-shaped floor pan portion of the floor construction.

FIG. 5 is a side elevational view of the X-shaped floor pan.

FIG. 6 is a top plan view of the X-shaped floor pan.

FIG. 7 is a perspective view of a T-shaped floor pan portion of the floor construction.

FIG. 8 is front elevational view of the T-shaped floor pan.

FIG. 9 is a top plan view of the T-shaped floor pan.

FIG. 10 is a side elevational view of the T-shaped floor pan.

FIG. 23 is a top plan view of a pair of X-shaped floor pans positioned adjacent one another prior to interconnection.

FIG. 24 is a fragmentary cross-sectional view of the X-shaped floor pans shown in FIG. 23, with a connector bridge positioned thereover for interconnecting the same.

FIG. 25 is a fragmentary, cross-sectional view of the X-shaped connector pans shown in FIG. 23, wherein the connector bridge is positioned bridging the same prior to attachment.

FIG. 26 is a fragmentary, cross-sectional view of the X-shaped connector pans shown in FIG. 23, wherein the connector bridge is attached thereto, and wires are routed through associated raceways.

FIG. 27 is a fragmentary, top plan view of a plurality of different types of floor pans interconnected by associated bridges prior to routing cabling therethrough.

FIG. 32 is a front elevational view of the utility post.

FIG. 33 is a side elevational view of the utility post.

FIG. 34 is a horizontal cross-sectional view of the utility post, taken along the line XXXIV—XXXIV, FIG. 32.

FIG. 35 is a cross-sectional view of the utility post, taken along the line XXXV—XXXV, FIG. 34.

FIG. 36 is a partially schematic, fragmentary cross-sectional view of the floor construction with a utility post mounted thereon.

FIG. 37 is a cross-sectional view of the utility post shown in FIG. 36, taken along the line XXXVII—XXXVII, FIG. 36.

FIG. 38 is a cross-sectional view of the utility post shown in FIG. 36, taken along the line XXXVIII—XXXVIII, FIG. 36.

FIG. 62 is a plan view of a sheet metal blank showing the flat pattern of the one-piece in-floor outlet.

FIG. 63 is a top view of a partially formed one-piece in-floor outlet.

FIG. 64 is an end elevation of the partially formed in-floor outlet showing the formal legs.

DETAILED DESCRIPTION OF THE PREFERRED EMBODIMENTS

Figure 1:
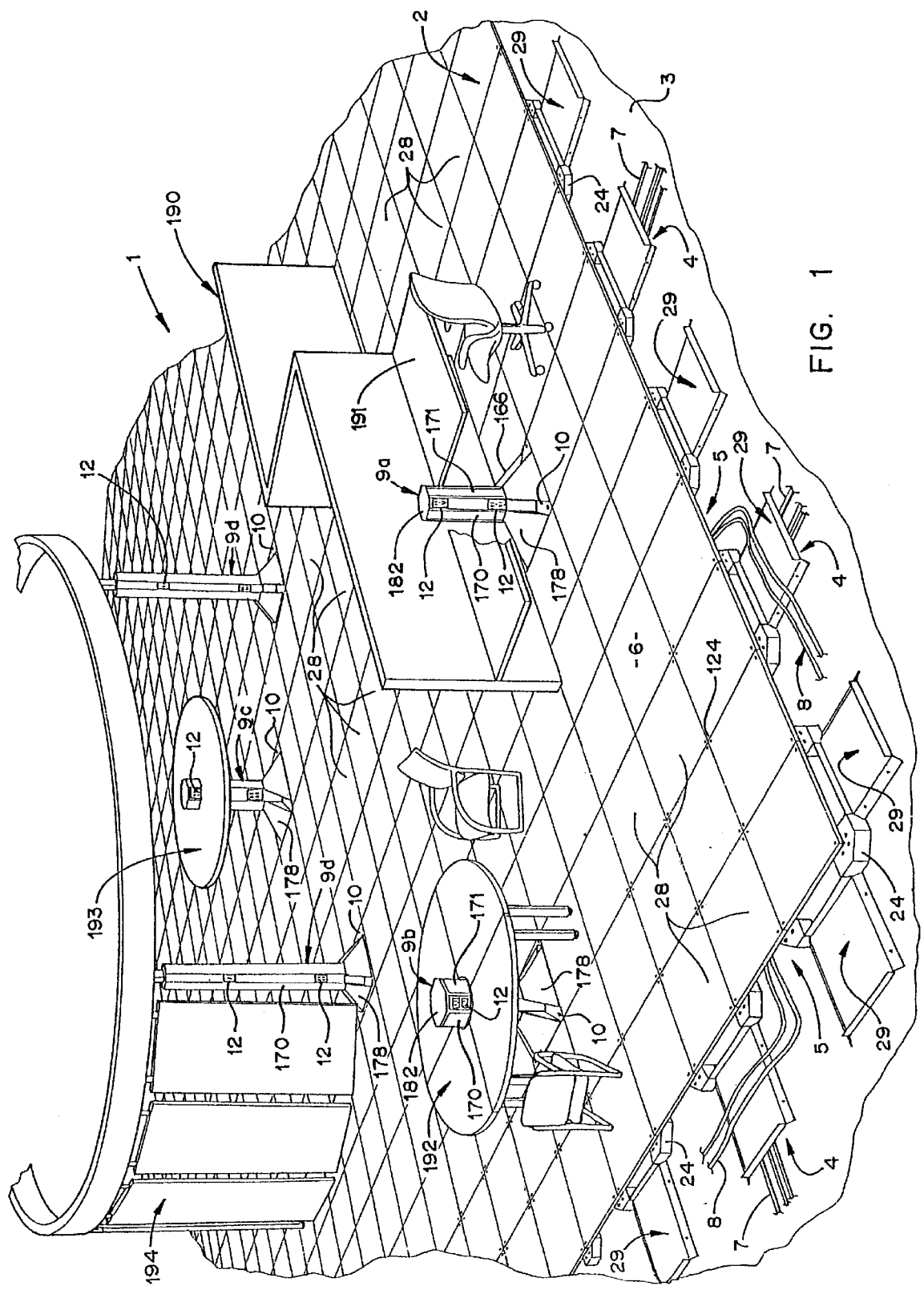
FIG. 1 is a fragmentary perspective view of a utility distribution system embodying the present invention, comprising a prefabricated floor construction, and associated utility posts.
Figure 2:
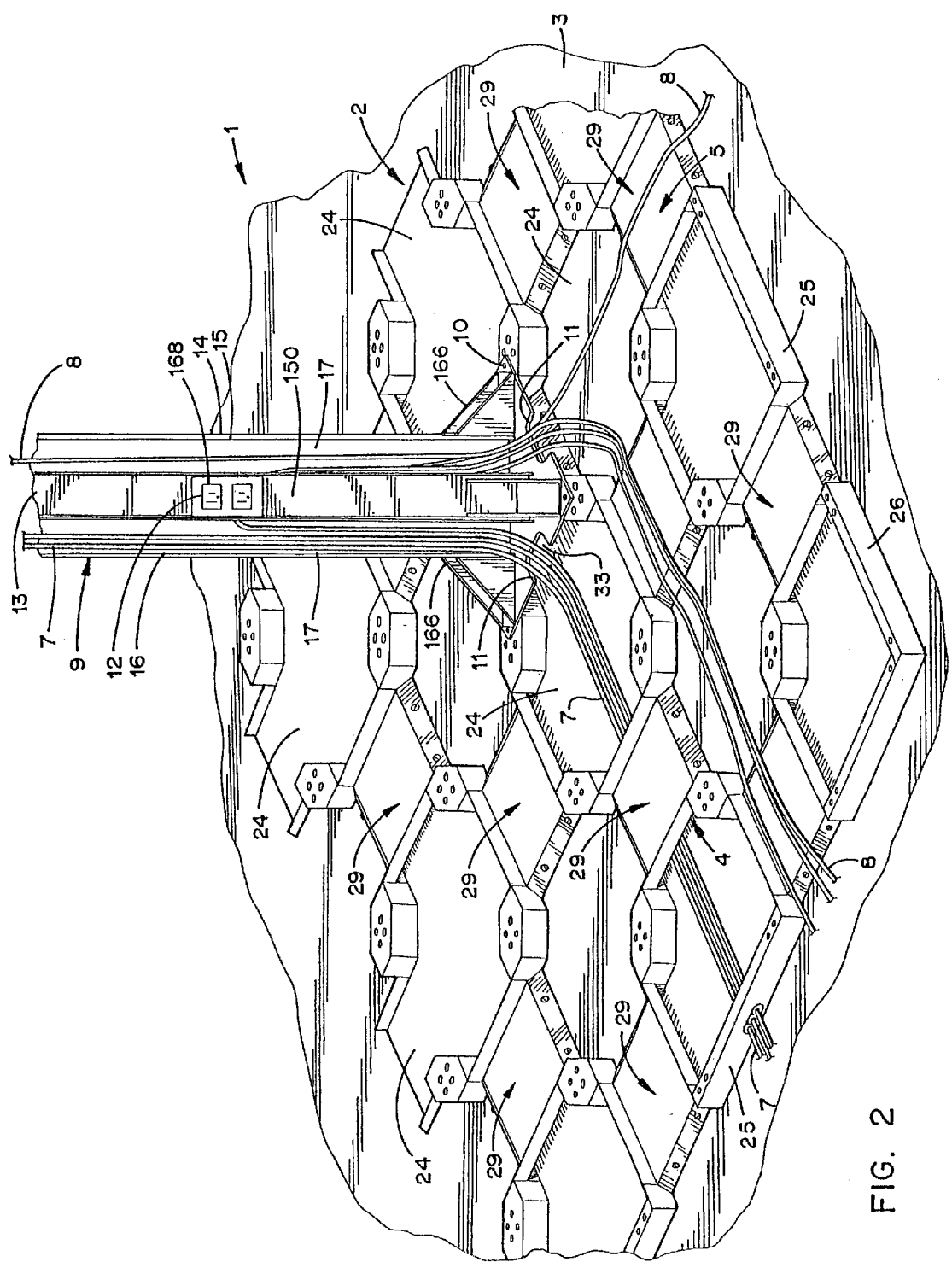
FIG. 2 is a fragmentary perspective view of the floor construction and one of the utility posts, wherein cover plate portions of the floor construction have been removed to reveal internal construction.
Figure 45:
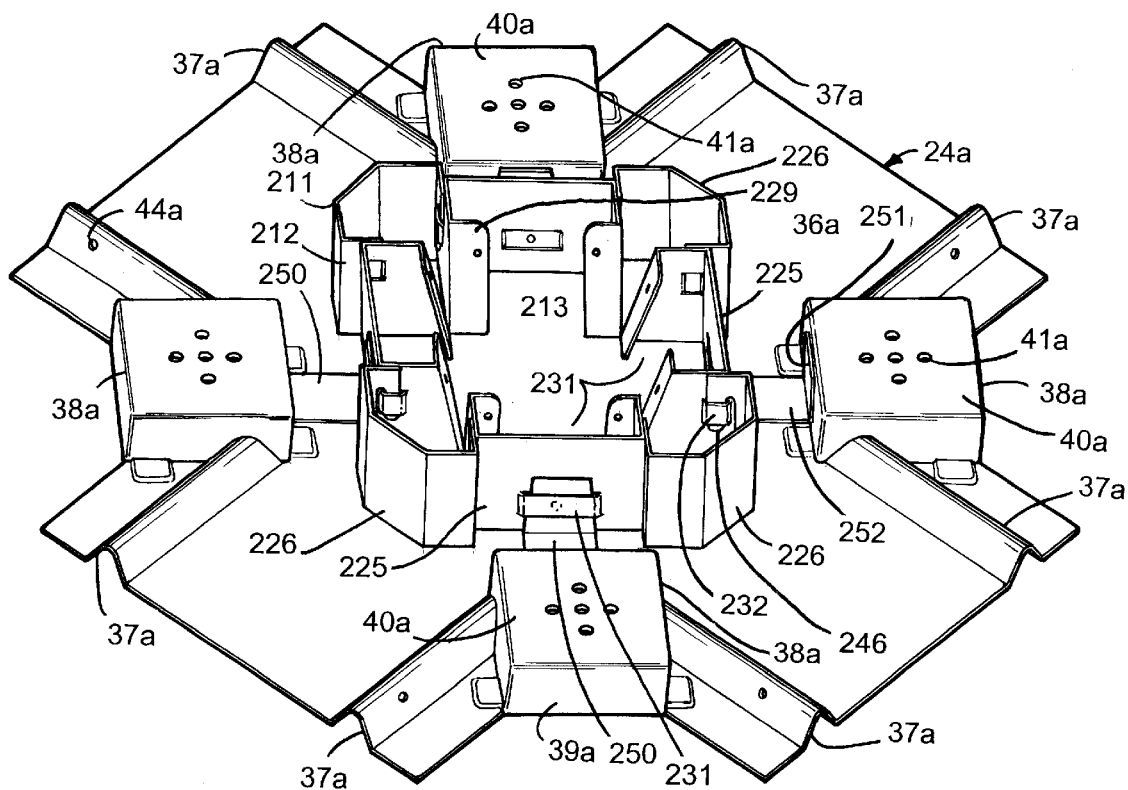
FIG. 45 is a perspective view of a base portion of the in-floor utility outlet shown installed on alternate X-shaped floor pan.

For purposes of description herein, the terms "upper," "lower," "right," "left," "rear," "front," "vertical," "horizontal," and derivatives thereof shall relate to the invention as oriented in FIGS. 1, 2 and 45. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a utility distribution system embodying the present invention, which is particularly designed for use in open office plans, and other similar settings and environments. In the illustrated example, utility distribution system 1 includes a prefabricated floor construction 2 configured to be supported on a building floor 3. Floor construction 2 has a hollow interior arrangement that defines raceways 4 and 5 to route utility conduits 7 and 8 therethrough, and a floor surface 6 on which workstations may be positioned. It is to be understood that the term "utility conduit" as used herein contemplates various devices and arrangements for transmitting utilities between two points, such as air ducts, fluid pipes, electrical wires, fiber optic cables, and the like. The illustrated distribution system 1 also includes at least one utility post 9 having a foot portion 10 which mounts to floor construction 2 to support utility post 9 in a generally upstanding orientation. The foot portion 10 of utility post 9 has an open area 11 (FIG. 2) disposed above and communicating with at least one of the floor raceways 4 and 5. At least one utility outlet 12 is mounted on utility post 9, and is adapted to dispense a selected utility therefrom, such as electrical power, communication signals, HVAC, conditioned water, etc. Utility post 9 has utility channels 13–16, each having an outwardly oriented open face 17, and being shaped so that one or more of the utility conduits 7 or 8 can be routed therein. Each one of the utility channels 13–16 extends continuously between and communicates with an associated utility outlet 12 and an associated open area 11 of utility post foot 10, such that utilities can be readily provided to the workstations by simply pulling selected utility conduits 7 and 8 from floor raceways 4 and 5, through the open areas 11 in the foot portion 10 of an adjacent utility post 9, and then laying them into the utility channels 13–16 of utility post 9 by insertion into the open faces 17 thereof to a location adjacent the utility outlets 12 for connection therewith.

Figure 30:
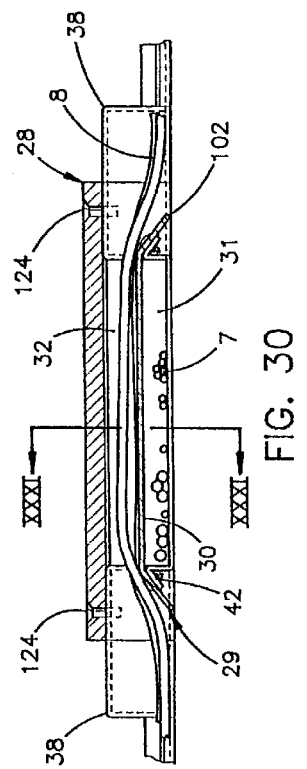
FIG. 30 is a fragmentary, cross-sectional view of the X-shaped floor pan and cover plate shown in FIG. 29, wherein the cover plate is fastened to the floor pan, and wires are routed through raceways formed therein.
Figure 31:
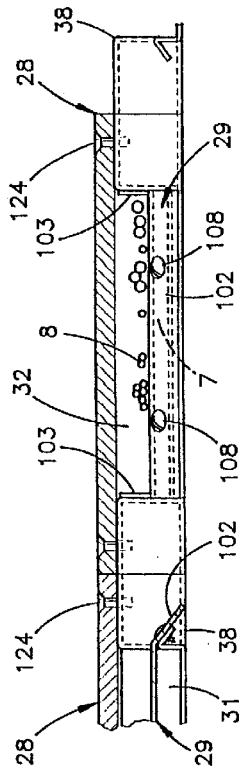
FIG. 31 is a cross-sectional view of the floor construction shown in FIG. 30, taken along the line XXXI—XXXI, FIG. 30.
Figure 28:
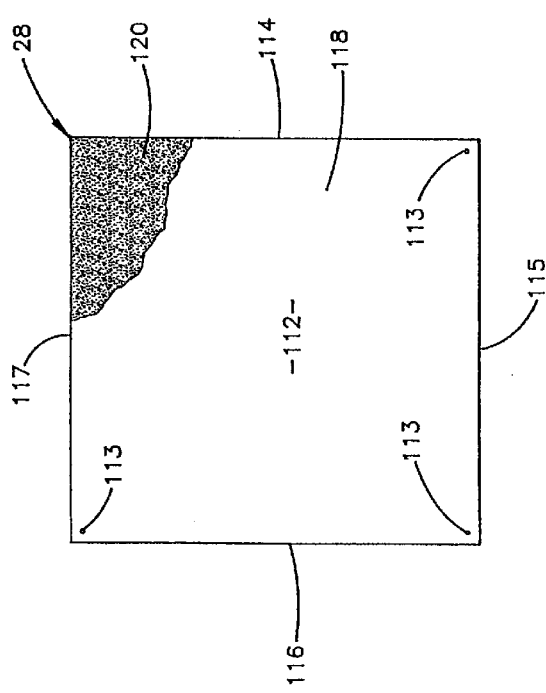
FIG. 28 is a top plan view of a cover plate portion of the floor construction.
Figure 29:
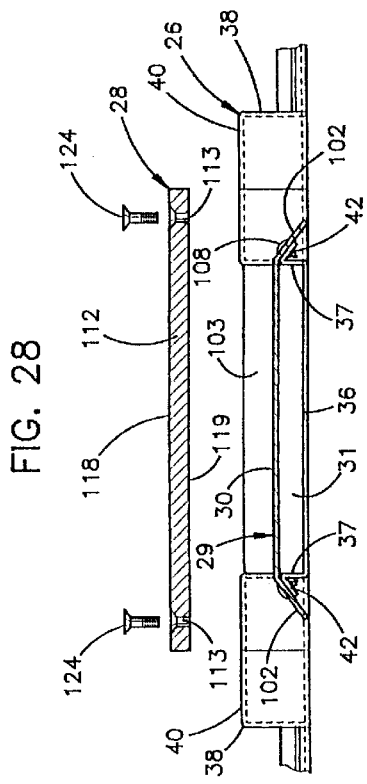
FIG. 29 is a fragmentary, cross-sectional view of an X-shaped floor pan with an associated cover plate positioned thereover prior to attachment.

In the illustrated example, floor construction 2 (FIG. 3) is a prefabricated assembly that is designed to be supported directly on top a conventional building floor. Floor construction 2 includes a plurality of floor base members or pans 24–27, which are abuttingly supported on the floor surface 6 in a mutually adjacent, lattice-like arrangement. Each of the floor pans 24–27 has a generally U-shaped configuration, with a base that defines at least a portion of the raceway 4 extending generally continuously throughout floor construction 2. Rigid cover plates 28 are supported on floor pans 24–27 in a mutually adjacent arrangement to generally enclose raceway 4, and define the continuous floor surface 6 thereover. A plurality of connector bridges 29 extend between adjacent floor pans 24–27, and are attached thereto to physically interconnect the same. Connector bridges 29 each include a separator plate 30 (FIGS. 25 & 26) positioned a spaced apart distance above the bases of the adjacent floor pans 24–27 to form thereunder a lower connector raceway 31, which in combination with raceway 4, is adapted to receive a first type of utility therein, such as power conduits 7. The separator plate 30 of connector bridge 29 is positioned a spaced apart distance below the overlying cover plates 28 (FIGS. 30 & 31) to form thereover an upper connector raceway 32, oriented generally perpendicular to the lower connector raceway 31, which in combination with raceway 5 is adapted to receive and retain a second utility therein, such as communication or signal conduits 8. In this fashion, the power conduits 7 and signal conduits 8 can be routed through floor construction 2, while being physically separated from one another, so as to avoid both physical and/or functional interference between the same. It is to be understood that floor pans 24–27 may take a variety of different shapes and configurations, and in the examples illustrated herein, floor construction 2 includes an X-shaped floor pan 24, a T-shaped floor pan 25, an L-shaped floor pan 26, and a diagonal floor pan 27, all of which are mutually interconnected by connector bridges 29, and enclosed by cover plates 28, as discussed in greater detail hereinafter.

With reference to FIGS. 4–6, the illustrated X-shaped floor pan 24 is rigid, and has a generally U-shaped vertical cross-sectional configuration, comprising an X-shaped base 36, and four pairs of upstanding sidewalls 37. X-shaped floor pan 24 has four raised pedestals 38 positioned adjacent each exterior corner of pan base 36, which are configured to support cover plates 28 thereon. Each pedestal 38 has a generally hexagonal top plan configuration, with six sidewalls 39, and an upper pad 40 with four fastener apertures 41 therethrough arranged in a square pattern. Each pair of upstanding pan sidewalls 37 associated with X-shaped floor pan 24 has an angle flange 42 along its upper edge 43, which angle flange 42 extends downwardly therefrom at an angle of approximately 45°. Each angled flange 42 has a perpendicularly oriented fastener aperture 44 therethrough for attaching an associated connector bridge 29. The upper edge 43 of each pair of pan sidewalls 37 is positioned at a preselected distance below the upper pad 40 of the associated raised pedestal 38 to accommodate the mounting of a connector bridge 29 on angle flanges 42, and thereby separating or dividing the interior space of X-shaped floor pan 24 between lower connector raceway 31, and upper connector raceway 32, as described in greater detail below. In the illustrated example, the upper edges 43 of each pair of floor pan sidewalls 37 are positioned at around the vertical midpoint of the associated raised pedestal 38.

With reference to FIGS. 7–10, the illustrated T-shaped floor pan 25 is rigid, and has a generally U-shaped vertical cross-sectional configuration, comprising a T-shaped base 48, and three pairs of upstanding sidewalls 49. T-shaped floor pan 25 has two raised pedestals 50 positioned adjacent the interior facing corners of pan base 48, which are configured to support cover plates 28 thereon. Each pedestal 50 has a generally hexagonal top plan configuration, with six sidewalls 51, and an upper pad 52 with four fastener apertures 53 therethrough arranged in a square pattern. Each pair of upstanding pan sidewalls 49 associated with T-shaped floor pan 25 has an angle flange 54 along its upper edge 55, wherein angle flange 54 extends downwardly therefrom at an angle of approximately 45°. Each angle flange 54 has a perpendicularly oriented fastener aperture 56 therethrough for attaching an associated connector bridge 29. The upper edge 55 of each pair of pan sidewalls 49 is positioned a preselected distance below the upper pad 52 of the associated raised pedestal 50 to accommodate the mounting of connector bridge 29 on angle flanges 54, and thereby separating or dividing the interior space in T-shaped floor pan 25 between lower connector raceway 31, and upper connector raceway 32, as described in greater detail below. In the illustrated example, the upper edges 55 of each pair of floor pan sidewalls 49 are positioned at around the vertical midpoint of the associated raised pedestal 50. A raised support channel 57 extends along the exterior edge of pan base 48, and includes a sidewall 58, end walls 59, and an upper flange 60 positioned generally level with the upper pads 52 of pedestals 50. The upper flange 60 of support channel 57 is shaped to support cover plates 28 thereon, and includes four perpendicularly oriented fastener apertures 61 therethrough to facilitate connection with cover plates 28.

Figure 12:
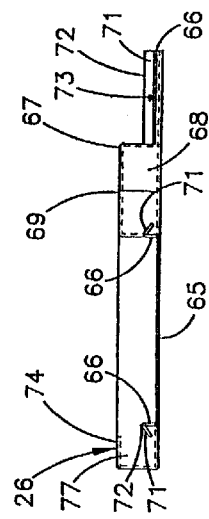
FIG. 12 is a side elevational view of the L-shaped floor pan.
Figure 11:
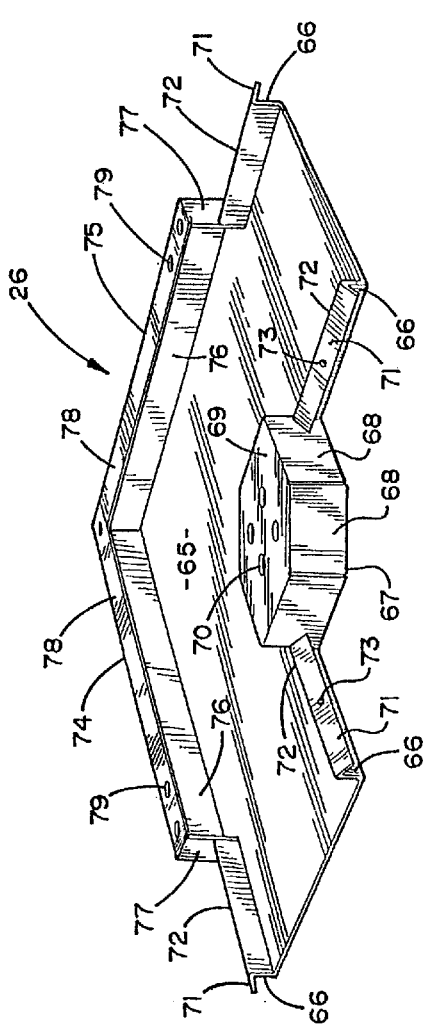
FIG. 11 is a perspective view of an L-shaped floor pan portion of the floor construction.
Figure 13:
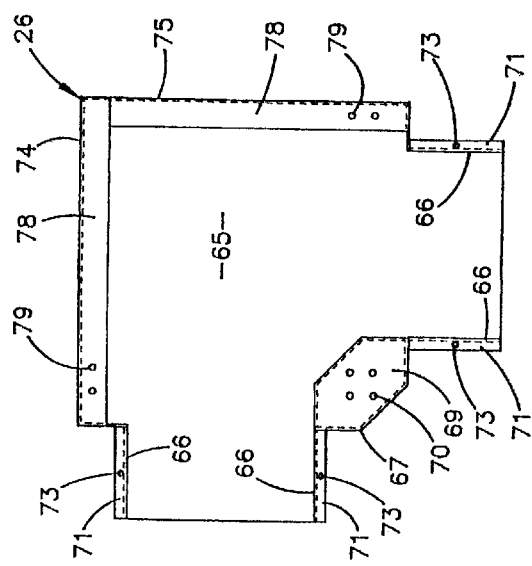
FIG. 13 is a top plan view of the L-shaped floor pan.
Figure 15:
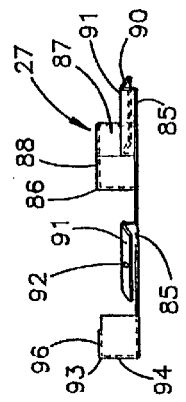
FIG. 15 is a side elevational view of the diagonal floor pan.
Figure 17:
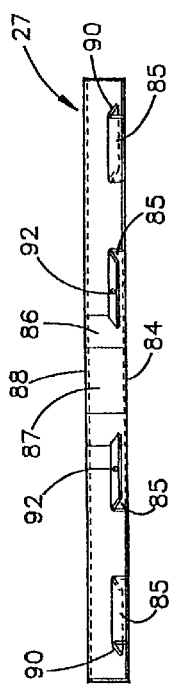
FIG. 17 is a front elevational view of the diagonal floor pan.
Figure 14:
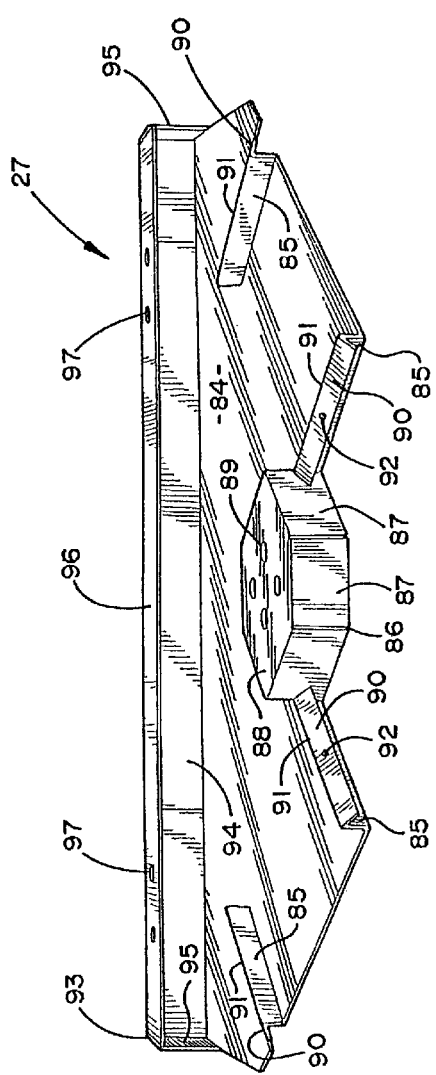
FIG. 14 is a perspective view of a diagonal floor pan portion of the floor construction.
Figure 16:
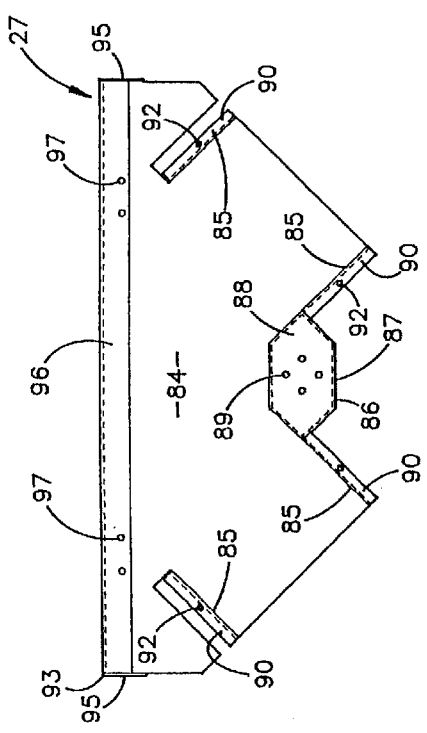
FIG. 16 is a top plan view of the diagonal floor pan.
Figure 19:
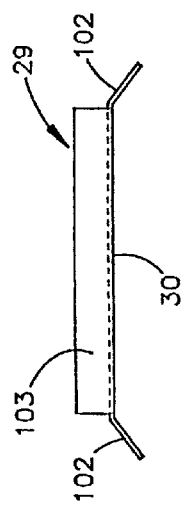
FIG. 19 is a front elevational view of the connector bridge.
Figure 21:
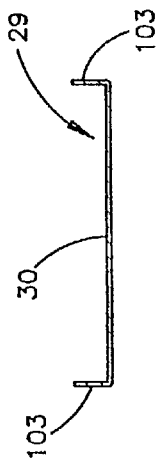
FIG. 21 is a cross-sectional view of the connector bridge, taken along the line XXI—XXI, FIG. 20.
Figure 22:
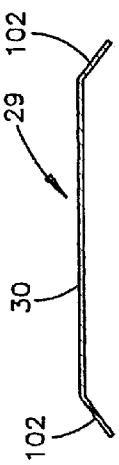
FIG. 22 is a cross-sectional view of the connector bridge, taken along the line XXII—XXII, FIG. 20.
Figure 18:
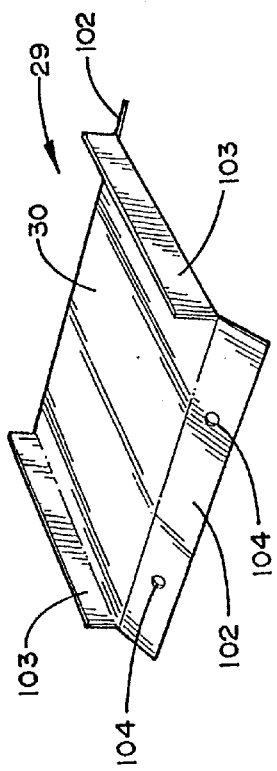
FIG. 18 is a perspective view of a connector bridge portion of the floor construction.
Figure 20:
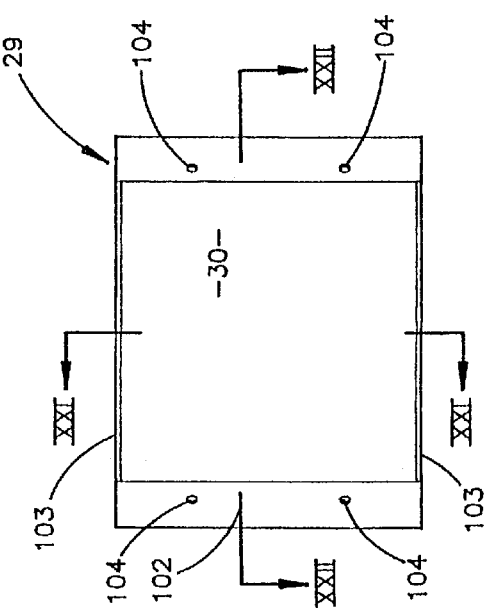
FIG. 20 is a top plan view of the connector bridge.

With reference to FIGS. 11–13, the illustrated L-shaped floor pan 26 is rigid, and has a general U-shaped vertical cross-sectional configuration, comprising an L-shaped base 65, and two pairs of upstanding sidewalls 66. L-shaped floor pan 26 has one raised pedestal 67 positioned adjacent the interior facing corner of pan base 65, and is configured to support cover plates 28 thereon. Pedestal 67 has a generally hexagonal top plan configuration, with six sidewalls 68, and an upper pad 69 with four perpendicularly oriented fastener apertures 70 therethrough arranged in a square pattern. Each pair of upstanding pan sidewalls 66 associated with L-shaped floor pan 26 has an angle flange 71 extending along its upper edge 72, wherein angle flange 71 extends downwardly therefrom at an angle of approximately 45°. Each angle flange 71 has a perpendicularly oriented fastener aperture 73 therethrough for attaching an associated connector bridge 29. The upper edge 72 of each pan si all 66 is positioned a preselected distance below the upper pad 69 of raised pedestal 69 to accommodate the mounting of a connector bridge 29 on angle flanges 71, and thereby separating or dividing the interior space of L-shaped floor pan 26 between lower connector raceway 31, and upper connector raceway 32, as described in greater detail below. In the illustrated example, the upper edges 72 of floor pan sidewalls 66 are positioned at around the vertical midpoint of raised pedestal 67. A pair of raised support channels 74 and 75 extend along the exterior facing side edges of pan base 65, and each includes a sidewall 76, end walls 77, and an upper flange 78 positioned generally level with the upper pad 69 of pedestal 67. The upper flange 78 of each support channel 74 and 75 is shaped to support cover plates 28 thereon, and includes perpendicularly oriented fastener apertures 79 to facilitate detachable connection with cover plates 28.

With reference to FIGS. 14–17, the illustrated diagonal floor panel 27 is rigid, and has a generally U-shaped vertical cross-sectional configuration, comprising a W-shaped base 84, and two pairs of upstanding sidewalls 85. Diagonal floor pan 27 has one raised pedestal 86 positioned adjacent the interior facing corner of pan base 84, and is configured to support cover plates 28 thereon. Pedestal 86 has a generally hexagonal top plan configuration, with six sidewalls 87, and upper pad 88 with four perpendicularly oriented fastener apertures 89 therethrough arranged in a square pattern. Each pair of upstanding pan sidewalls 85 associated with diagonal floor pan 27 has an angle flange 90 along its upper edge 91, wherein angle flange 90 extends downwardly therefrom at an angle of approximately 45°. Each angle flange 90 has a perpendicularly oriented fastener aperture 92 therethrough for attaching an associated connector bridge 29. The upper edge 91 of both pairs of pan sidewalls 85 is positioned a preselected distance below the upper pad 88 of pedestal 86 to accommodate the mounting of a connector bridge 29 on angle flanges 90, and thereby separating or dividing the interior space of diagonal floor pan 27 between lower connector raceway 31, and upper connector raceway 32, as described in greater detail below. In the illustrated example, the upper edges 91 of both pairs of floor pan sidewalls 85 are positioned at around the vertical midpoint of raised pedestal 86. A raised support channel 93 extends along the exterior facing side edge of pan base 84, and includes a sidewall 94, end walls 95, and an upper flange 96 positioned generally level with the upper pad 88 of pedestal 86. The upper flange 96 of support channel 93 is shaped to support cover plates 28 thereon, and includes perpendicularly oriented fastener apertures 97 to facilitate the detachable connection of cover plates 28.

Floor pans 24–27 may be constructed from formed sheet metal, molded plastic, and other similar arrangements, and are preferably capable of effectively isolating various electrical wires, such as power conduits 7 and signal conduits 8 from one another. Although floor pans 24–27 are rigid to securely support cover plates 28 thereon, due to their modular construction, they will generally conform to an existing building floor surface 6, even when the same is not precisely level.

With reference to FIGS. 18–22, the illustrated connector bridge 29 is rigid, and has a generally U-shaped vertical cross-sectional configuration, comprising a flat or planar separator plate 30, having a pair of side flanges 102 depending from one pair of opposite side edges of plate 30, and a pair of upper flanges 103 upstanding from the opposite pair of side edges of plate 30. Side flanges 102 are oriented at an angle of approximately 45° with respect to separator plate 30, extend generally continuously therealong, and each includes a pair of perpendicularly oriented fastener apertures 104 therethrough to facilitate connection with floor pans 24–27. Upper flanges 103 are oriented substantially perpendicular with respect to separator plate 30, and extend generally continuously along the side edges thereof. Like floor pans 24–27, connector bridge 29 may be constructed from formed sheet metal, molded plastic, or other similar arrangements, and is preferably capable of effectively isolating various electrical wires, such as power conduits 7 and signal conduits 8 from one another.

With reference to FIGS. 23–27, floor construction 2 is assembled in the following manner. Floor pans 24–27 are selected and arranged on the building floor surface 6 in the desired configuration, such as the arrangements shown in FIGS. 2 and 3. T-shaped floor pans 25 are generally arranged about the periphery or marginal portion of the floor construction 2, while L-shaped floor pans 26 are typically positioned at each right angle corner thereof. Diagonal floor pans 27 may be positioned about the marginal portion of a floor construction 2 which has one side disposed at a 45° angle with respect to the remaining sides. X-shaped floor pans 25 are typically positioned interior of the marginal portion of floor construction 2. Floor construction 2 can be arranged so that it covers the entire expanse of building floor 3, or can be configured to cover only selected areas thereof, so as to provide one or more utility pads that are located strategically throughout the open plan.

In all such embodiments, floor pans 24–27 (FIGS. 23–27) are arranged on building floor 3, such that the end edges of their associated bases are positioned adjacent one another in the manner illustrated in FIG. 23. Connector bridges 29 are then positioned over the joint formed between adjacent floor pans 24–27 in the manner illustrated in FIGS. 24–25. At each joint, the side flanges 102 of connector bridge 29 are positioned in abutment with the angle flanges of associated pan sidewalls, such as the angle flanges 42 of the X-shaped pan sidewalls 37 shown in FIGS. 24–26. Fasteners 108 are then inserted through the apertures 104 of connector bridge 29 and into the underlying apertures 44 in angle flanges 42, so as to securely interconnect adjacent floor pans 24–27 in their selected orientation, as illustrated in FIG. 27.

As best illustrated in FIGS. 25 and 26, the attachment of a connector bridge 29 to two adjacent floor pans 24–27 not only physically interconnects the same, but also assists in defining connector portions of the two utility raceways 4 and 5, which extend throughout floor construction 2. For example, when the two X-shaped floor pans 24 shown in FIG. 23 are interconnected by a connector bridge 29, as shown in FIG. 26, the interconnected leg portions 105 of pan bases 36 are enclosed by separator plate 30, such that pan base 36, pan sidewalls 37 and bridge separator plate 30 combine to create a fully enclosed raceway which is identified herein as lower connector raceway 31. Lower connector raceway 31 communicates directly with utility raceway 4, which is formed by the interior areas of the remaining floor pans 24–27. Connector bridge 29 also forms a portion of upper connector raceway 32, which is disposed directly above lower connector raceway 31, and is oriented perpendicular therewith. The upper connector raceway 32 is also fully enclosed after floor construction 2 is installed, and is defined by bridge separator plate 30, opposite bridge flanges 103, and cover plate 28. Upper connector raceway 32 communicates directly with utility raceway 5, which is formed by that space disposed beneath cover plates 28, and exterior to floor pans 24–27. In the illustrated example, utility raceway 4 is particularly designed to route electrical power conduits 7 through floor construction 2, while utility raceway 5 is particularly designed to route data and/or communication cables through floor construction 2.

After the selected floor pans 24–27 are interconnected by connector bridges 29 in the manner shown in FIGS. 23–27, and before assembly of cover plates 28, an initial utility installation may be made in floor construction 2. In the illustrated example, electrical power conduits 7 and signal cables 8 are installed in utility raceways 4 and 5 respectively in a fashion designed to provide utilities to each planned workstation, or in a predetermined plan which routes the utilities to each possible workstation location. In the floor construction shown in FIGS. 1–3, signal cables 8 can be simply laid in position in raceway 5 by routing them over that portion of the building floor disposed between adjacent floor pans 24–27, and over the separator plates 30 of selected connector bridges 29, through upper connector raceways 32, in a somewhat zigzag pattern. Electrical power conduits 7 are routed through raceway 4 by laying the same into the interior of floor pans 24–27, and threading the wires under the separator plates 30 of selected connector bridges, through lower connector raceways 31, in a checkerboard pattern. It is to be noted that in some installations, it may be possible to lay power conduits 7 in floor pans 24–27 before connector bridges 29 are attached, so as to avoid threading the wires through lower connector raceways 31.

With references to FIGS. 28–31, each of the illustrated cover plates 28 comprises a rigid base plate 112 having a substantially square top plan configuration, with four perpendicularly oriented fastener apertures 113 extending therethrough adjacent each corner of base plate 112. Each base plate 112 includes opposite side edges 114–117, and planar, mutually parallel upper and lower surfaces 118 and 119 respectively. In the example illustrated in FIG. 28, a segment of carpet 120, or other similar floor covering is adhered to the upper surface 118 of base plate 112. Base plate 112 may be constructed of sheet metal, plastic, or other similar materials which are capable of supporting substantial weight thereon without sagging.

Figure 3:
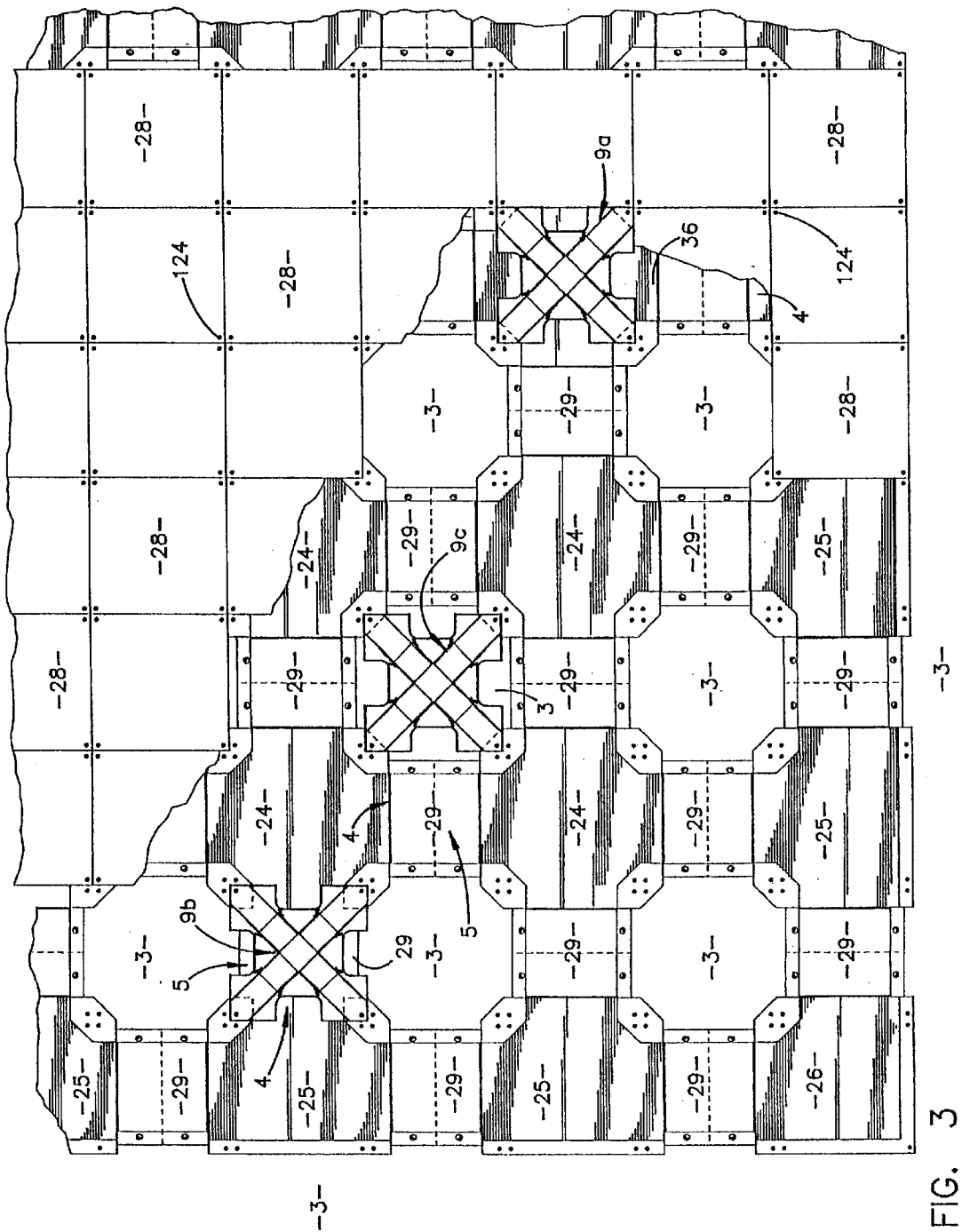
FIG. 3 is a fragmentary top plan view of the utility distribution system.

Cover plates 28 are assembled over the selected floor pans 24–27 to fully enclose floor construction 2, as shown in FIGS. 1 and 3. Cover plates 28 are juxtaposed side-by-side on floor pans 24–27 to form a continuous or uninterrupted floor surface 6 on which workstations and/or other furniture may be positioned. In the X-shaped floor pans 26 shown in FIGS. 29–31, a cover plate 28 is positioned on the four upper pads 40 of pan pedestals 38. Fasteners 124 are inserted through each of the four fastener apertures 113 in base plate 112 and mounted securely in the underlying pad apertures 41. Cover plates 28 are similarly mounted to floor pans 25–27, wherein cover plates 28 are also connected to the associated support channels, such as the support channel 57 of T-shaped floor pan 25, the two support channels 74 and 75 of L-shaped floor pan 26, and the support channel 93 of diagonal floor pan 27.

Cover plates 28 not only serve to form the upper support surface 6 for floor construction 2, but also enclose the underlying floor space, which includes those areas above floor pans 24–27, as well as the remaining open areas of building floor 3. As a result, raceways 4 and 5 are both fully enclosed, and are mutually separated, with connector bridges 29 serving to permit cross-over between raceways 4 and 5, while maintaining physical isolation or separation. In the event local regulations specify that existing building floors can not qualify as an electrical barrier, a sheet of insulating material can be applied over building floor 3 prior to assembly of floor construction 2 thereon to improve its utility distribution capabilities, particularly with respect to utility raceway 5.

The disclosed utility distribution system 1 (FIG. 1) also includes utility posts 9 which interact with floor construction 2 to distribute utilities to the various workstations. With reference to FIGS. 32–38, each of the illustrated utility posts 9 has a channel-like, elongated post portion 126, and a foot portion 10 shaped similar to cover plate 28, such that a cover plate 28 can be removed from floor pans 24–27, and the foot portion 10 of a utility post 9 mounted in its place. Utility posts 9 preferably have a rigid construction for upright mounting on floor construction 2, and may be provided in a plurality of different lengths or heights to accommodate a variety of needs and uses. With reference to FIG. 35, utility post foot 10 has a generally square overall plan configuration, similar to that of cover plate 28, and is defined by side edges 130–133, and upper and lower surfaces 134 and 135 respectively. Each of the side edges 130–133 of utility post foot 10 has an open, notched out area 31–36 located at a generally medial or central portion thereof. Each of the open foot notches 31–36 is defined by a base edge 137, and opposing side edges 138 oriented in a generally U-shaped plan configuration. Utility post foot 10 includes perpendicularly oriented fastener apertures 139 extending through each corner thereof, identical to the arrangement of fastener apertures 113 on cover plate 28.

As best illustrated in FIG. 34, the post portion 126 of utility post 9 has a generally X-shaped transverse cross-sectional configuration, comprising two parallel pairs of flat, perpendicularly intersecting walls 142–145. Intersecting walls 142–146 define a plurality of outwardly oriented, open-faced channels, which include four generally U-shaped mounting channels 148–151, and four generally V-shaped utility channels 13–16. The four mounting channels 148–151 are oppositely oriented in an outwardly radiating fashion, as are utility channels 13–16, which are positioned in between adjacent mounting channels 148–151. Mounting channel 148 is defined by wall segments 154–156, mounting channel 149 is defined by wall segments 157–159, mounting channel 150 is defined by wall segments 160–162, and mounting channel 151 is defined by wall segments 163–165. Utility channel 13 is defined by wall segments 154 and 165, utility channel 14 is defined by wall segments 155 and 157, utility channel 15 is defined by wall segments 159 and 160, and utility channel 16 is defined by wall segments 162 and 163. Four triangularly shaped gusset channels 166 interconnect the lower portion of post portion 126 with foot portion 10, and each includes a pair of sidewalls 167 oriented in radiating alignment with the corner fastener apertures 139 in foot portion 10. As best viewed in FIG. 35, the lower ends of utility channels 13–16 are aligned and communicate with an associated one of the open areas 31–34 of utility post foot 10, while the open ends of mounting channels 148–151 are aligned with the sidewalls 167 of an associated one of the gusset channels 116 on post foot 10.

Each of the utility channels 13–16 (FIGS. 36–38) has a generally triangular transverse cross-sectional configuration, and is adapted to receive and retain therein one or more utility conduits such as wires, cables, tubes, etc. Mounting channels 148–151 have a generally square transverse cross-sectional configuration, and are adapted to receive and retain therein one or more utility outlets 12, such as the illustrated duplex power outlet 168, the illustrated communication junction block 169, and other similar devices. Since mounting channels 148–151 are each generally open along their entire length, each utility channel can receive a plurality of utility outlets therein arranged in a vertically stacked configuration.

With reference to FIGS. 36–38, each of the utility channels 13–16 associated with utility post 9 includes a removable cover 170–173 which selectively encloses the same. In the illustrated example, each of the utility channel covers 170–173 includes a pair of inwardly angled side flanges 174 which matingly engage the outer free edges of the associated channel walls 142–145 to detachably mount the same on utility post 9 with a snap lock type of action. The illustrated utility post 9 also includes four, trapezoid shaped foot covers 178, which are positioned over the lower ends of utility channels 13–16. Each foot cover 178 (FIG. 36) includes an upper edge 179 extending adjacent the bottom on an associated one of the channel covers 170–173, a lower edge 180 extending along the upper surface 134 of post foot 10, and a pair of side edges 181 extending along the free edges of gusset sidewalls 167 to thereby enclose the lower part of each lower post portion 126 which is aligned with an associated utility channel 13–16. Foot covers 178 are detachably mounted to utility post 9 to permit ready access to the underlying raceways 4 and 5 in floor construction 2. Utility post 9 also includes a top cap 182 connected with the upper end of post portion 126, and enclosing the upper ends of each of the utility channels 13–16 and the mounting channels 148–151.

Figure 39:
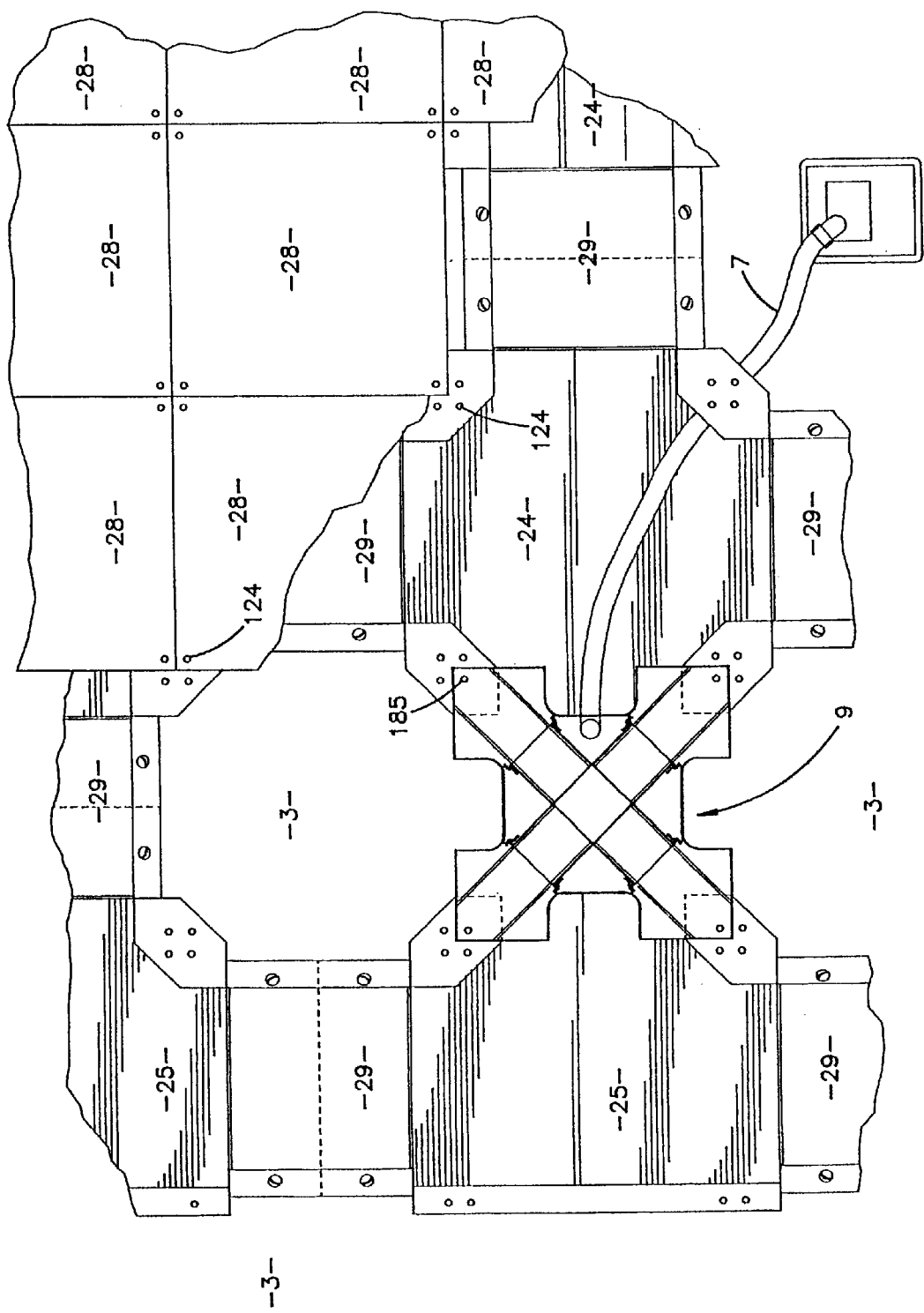
FIG. 39 is a fragmentary, top plan view of the floor construction with a utility post mounted thereon, with utility conduits being routed therethrough.

In operation, utility posts 9 may be assembled on floor construction 2 at any desired location in the following fashion. Assuming that cover plates 28 have been preassembled over each of the selected floor pans 25–27, the cover plate 28 disposed at that location at which each utility post 9 is desired must first be removed by simply removing associated fasteners 124, and detaching the selected cover plate 28 from its underlying floor pan or pans. A utility post 9 is then selected, and the foot portion 10 thereof is placed in the space vacated by the removed cover plate 28, such that foot base plate 112 is supported abuttingly on the underlying pan, such as in the arrangement shown in FIG. 39. Fasteners 185 are then inserted through the fastener aperture 139 in each corner of utility post foot 10, so as to securely mount utility post 9 on floor construction 2. Utility outlets 12 are mounted in the mounting channels 148–151 of utility post 9.

Mounting channels 148–151 are preferably preassigned or designated for use with certain types of utility outlets 12, so as to physically separate those utilities which might experience some degree of physical and/or functional interference. For example, the illustrated mounting channels 148 and 150 are assigned for power outlet devices, such as power outlet 168, and the opposite mounting channels 151 and 159 are assigned for communication junctions and other signal devices, such as signal block 169. Similarly, utility channels 13–16 are preferably preassigned or designated for use with certain types of utilities, such as power lines and signal cables. The illustrated utility channels 14 and 16 are assigned for power lines 7, and utility channels 13 and 15 assigned for signal cables or conductors 8. In any event, each of the various utility outlets 12 desired is mounted in an associated one of the mounting channels 148–152, preferably in accordance with the predesignated configuration noted above.

As best illustrated in FIG. 2, when utility post 9 is mounted on floor construction 2, the utility channels 13–16 are oriented to be in alignment with the underlying utility raceways 4 and 5. More specifically, one oppositely oriented pair of the utility channels 13–16 will open into utility raceway 4, and the other pair of oppositely oriented utility channels 13–16 will open into utility raceway 5. In the system shown in FIG. 2, utility raceway 4 has been designated for electrical power conduits 7, and utility raceway 5 has been designated for signal conduits 8, which include communication lines, data wires, etc. Hence, utility post 9 has been oriented on the X-shaped floor pan 24 to which it is attached with utility channel 16 and U-shaped foot opening 33 communicating with a forwardly facing side of power raceway 4, and utility channel 14 and U-shaped foot opening 31 communicating with a rearwardly facing side of power raceway 4. Furthermore, in this orientation, utility channel 15 and U-shaped foot opening 32 communicate with the forwardly facing side of signal raceway 5, and utility channel 13 and U-shaped foot opening 34 communicate with a rearwardly facing side of signal raceway 5. Power conduits 7 and signal conduits 8 may be fed into floor construction 2 in a variety of different ways, including the floor feed arrangement shown in FIG. 39 for power conduit 7, or the side feed arrangement shown in FIG. 2 for power conduits 7 and signal conduits 8.

With reference to FIG. 3, it will be noted that utility post 9 can be mounted at a plurality of locations on floor construction 2, including mounting on the four pedestals 38 of a single X-shaped floor pan 24, directly above the center portion of its associated base 36, as illustrated utility post 9a, or alternatively between the adjacent legs 105 of a T-shaped floor pan 25 and an X-shaped floor pan 24, directly above the connector bridge 29, as in illustrated utility post 9b, or alternatively on the four pedestals of four adjacent X-shaped floor pans 24, directly above the open building floor 3, as in illustrated utility post 9c. In each of these orientations, the utility channels 13–16 of the utility post 9 can be communicated with the utility raceways 4 and 5 in floor construction 2 to permit routing utilities, such as power conduits 7 and signal conduits 8 therethrough.

Utility conduits 7 and 8 are then routed from their associated raceways 4 and 5 within floor construction 2 to each of the selected utility outlets 12 in the following fashion. Selected cover plates 28 are first removed from around utility post foot 10, so as to expose the underlying raceways 4 and 5, and determine what utility conduits 7 and 8 are readily available. Utility conduits 7 and 8 are then selected and routed into the selected ones of the utility channels 13–16 by first routing the same through that one of the open foot areas 31–34 associated with the selected one of the utility channels 13–16. The utility conduits 7 and 8 are simply laid into the selected utility channels 13–16 by insertion into the open faces 17 thereof to a location adjacent the associated utility outlet 12 to which it is to be connected. An aperture is formed in the wall of post portion 126 disposed between the utility channel and the selected utility outlet, so that the selected utility conduit can be inserted into the utility outlet and thereby connected. After each such utility outlet 12 is similarly connected with its associated utility conduit 7 or 8, channel covers 170–173 are mounted over each utility channel 13–16, and foot covers 178 are mounted at the base of post portion 126.

With reference to FIG. 1, in one embodiment of the present invention, utility posts 9 are positioned freestanding on floor construction 2 adjacent those locations at which the selected utilities are desired. For instance, freestanding utility post 9a is positioned for use with a panel based systems furniture system 190, and may extend up through and/or adjacent associated worksurfaces 191. Utility post 9 might also be positioned between the sides of adjacent partition panels (not shown) to function as a spine with outlets 12 accessible on both sides of the panel system. Alternatively, the illustrated freestanding utility post 9b is used as a bollard for a mobile table system 192.

In yet another embodiment of the present invention, utility post 9 may be physically incorporated into a furniture system. For example, the illustrated utility post 9c is used to support a tabletop 193. Alternatively, the illustrated utility posts 9d are used as support columns in an overhead partitioning system 194, which is the subject of commonly assigned, co-pending U.S. patent application Ser. No. 774, 563. Utility posts 9 might be used as the vertical uprights in the workspace module arrangement which is the subject of commonly assigned, co-pending U.S. patent application Ser. No. 819,396. It is to be understood that utility post 9 may also be used to support a wide variety of other types of furniture applications, such as supports for partition panels, furniture unit supports, etc.

Figure 40:
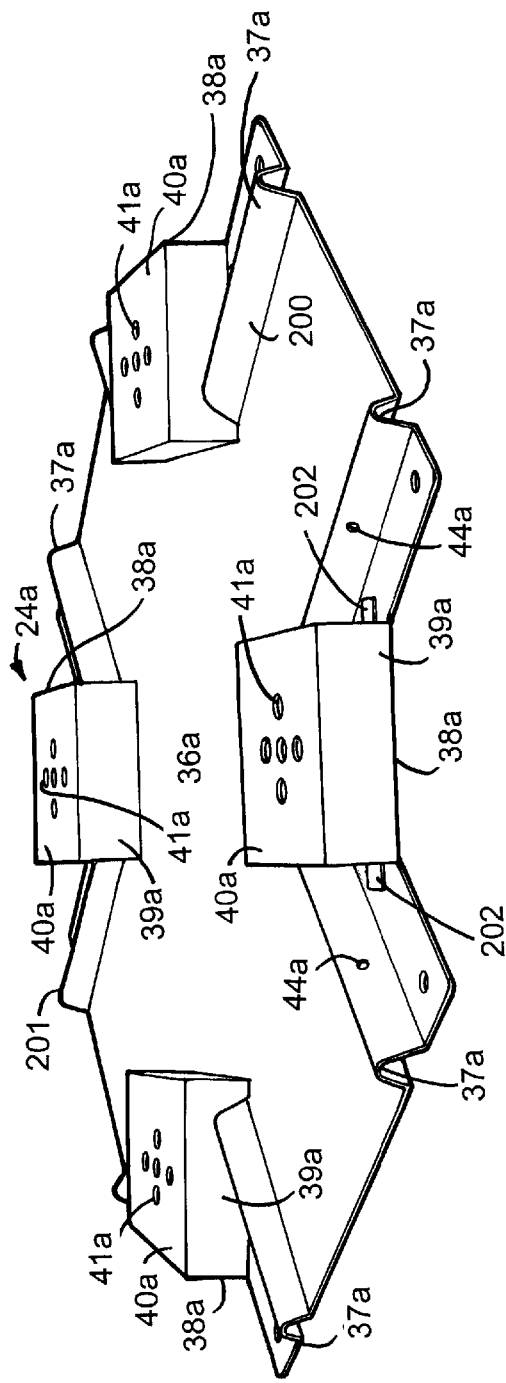
FIG. 40 is a perspective view of an alternate X-shaped floor pan portion of the floor construction which embodies the present invention.
Figure 41:
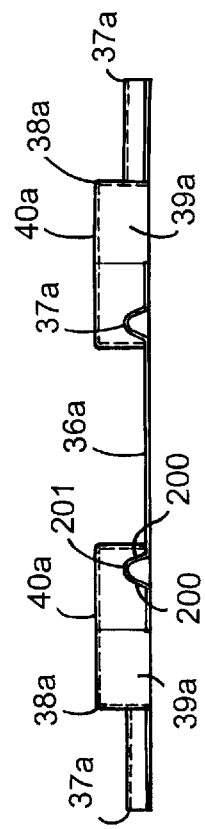
FIG. 41 is a side elevational view of the alternate X-shaped floor pan.
Figure 42:
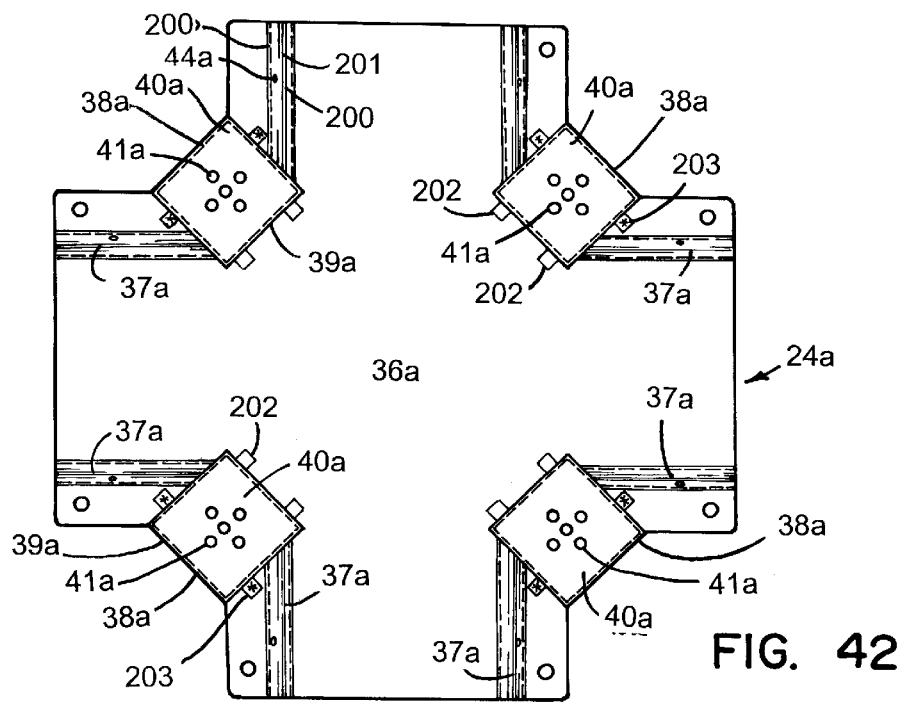
FIG. 42 is a top plan view of the alternate X-shaped floor pan.
Figure 43:
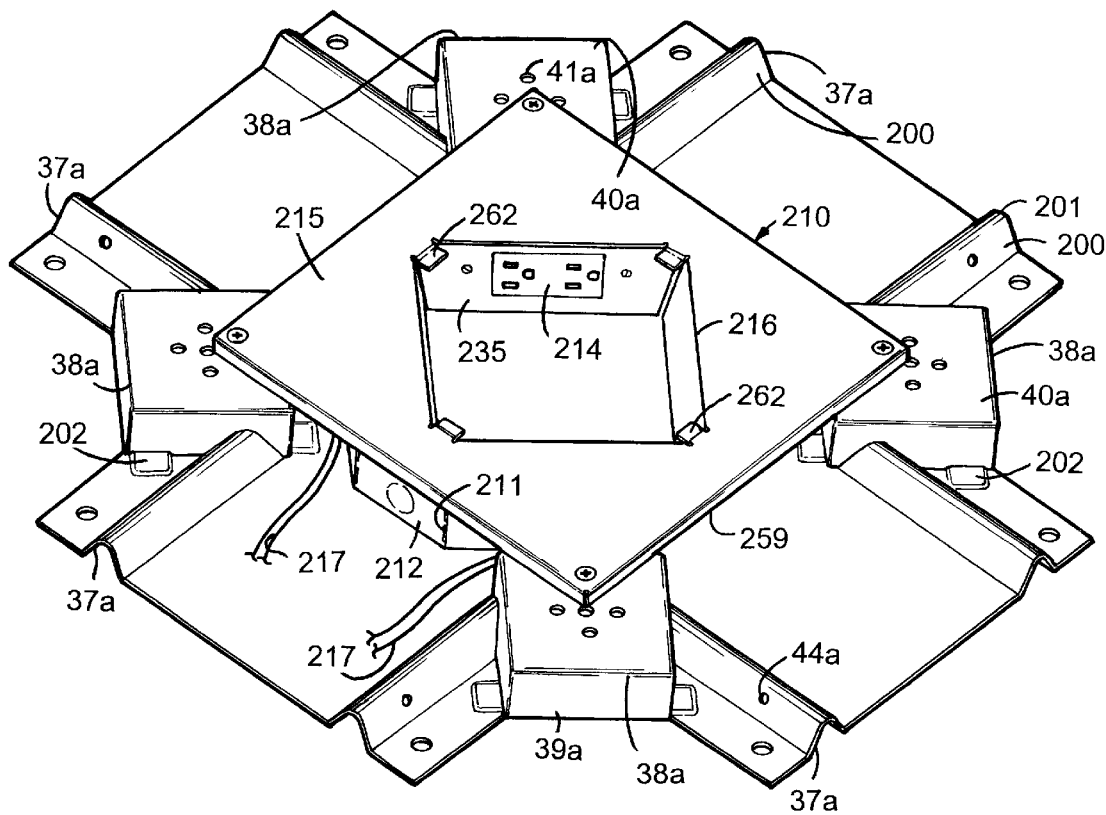
FIG. 43 is a perspective view of an in-floor utility outlet embodying the present invention, shown with an access cover portion thereof removed to reveal internal construction.

The reference numeral 24a (FIG. 40) generally designates an alternate embodiment of the X-shaped floor pan, having a configuration slightly different from the previously described floor pan 24. Since alternate X-shaped floor pan 24a is similar to the previously described floor pan 24, similar parts appearing in FIGS. 1–39 and 40–57 respectively are represented by the same, corresponding reference numeral, except for the suffix "a" in the numerals of the later. X-shaped floor pan 24a is functionally similar to the previously described X-shaped floor pan 1, but has a slightly different shape which is better adapted for high volume manufacture or production. More specifically, alternate X-shaped floor pan 24a is rigid, and has a generally U-shaped vertical cross-sectional configuration, comprising an X-shaped base 36a, and four pairs of upstanding sidewalls 37a, which are positioned interior of the marginal edge of base 36a. Alternate X-shaped floor pan 24a also has four raised pedestals 38a positioned adjacent each corner of pan base 36a, which are configured to support cover plates 28 thereon. Each pedestal 38a has a generally square top plan configuration, with four sidewalls 39a, and an upper pad 40a with five fastener apertures 41a therethrough arranged in a cruciform pattern. Each pair of upstanding pan sidewalls 37a associated with X-shaped floor pan 24a has an inverted U-shaped configuration, comprising opposite sidewalls 200 in an arcuate center portion 201. The arcuate center portion 201 of each pair of pan sidewalls 37a is positioned at a preselected distance below the upper pad 40a of the associated raised pedestal 38a to accommodate the mounting of a connector bridge 29 thereon in a manner similar to previously described X-shaped floor pan 24. The illustrated pedestals 38a each have four tab-shaped feet 202 which extend outwardly along the lower edges thereof, and provide attachment points for connecting pedestals 38a to base 36a by a variety of different fasteners, such as the illustrated spot welds 203. The exterior flanges 200 of sidewall 37a include fastener apertures 44a to facilitate attachment of an associated connector bridge 29, as described above.

The reference numeral 210 (FIGS. 43–57) generally designates an in-floor utility outlet embodying the present invention, which is particularly adapted for use in conjunction with raised floor constructions and the like, such as the previously described floor construction 2. In-floor utility outlet 210 includes a drop-in style base 211 (FIGS. 45 & 46) having a sidewall 212 with a generally closed plan shape, and at least one opening or port 213 to mount a utility outlet 214 (FIG. 43) therein. A cover plate 215 with a central aperture 216 therethrough extends over the sidewall 212 of base 211 to enclose utility lines 217 associated with the outlets 214. An access cover 218 (FIG. 44) is received in the central aperture 216 of cover plate 215 flush with the same, and includes at least one aperture 219 through which utility tap-in lines 220 can be routed below the floor surface for connection with the utility outlets 214.

The in-floor utility outlet 210 illustrated in FIGS. 43–57 is shown installed on an alternate X-shaped floor pan 24a. However, it is to be understood that in-floor utility outlet 210 may also be mounted on X-shaped floor plan 24, as well as other types of prefabricated floor constructions.

Figure 50:
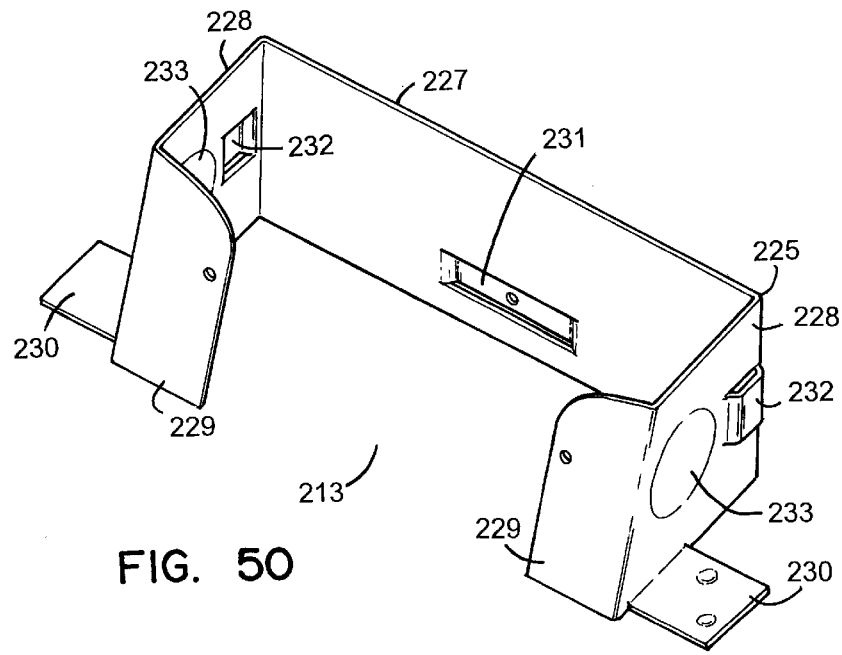
FIG. 50 is a perspective view of the box wall.
Figure 44:
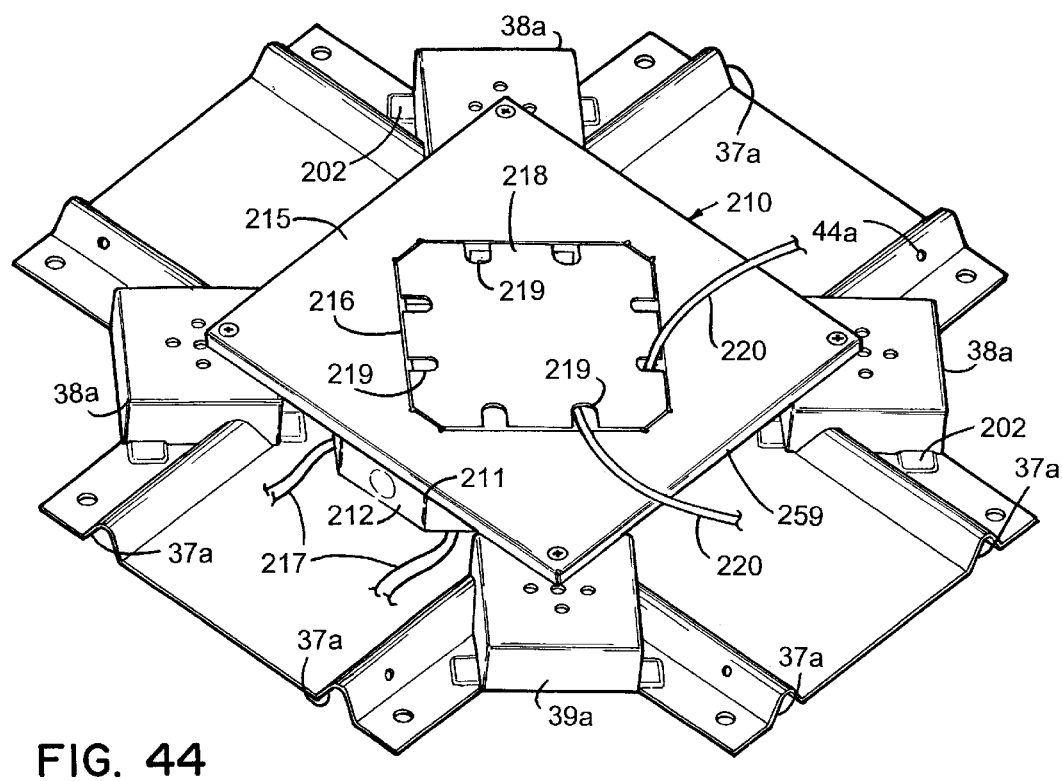
FIG. 44 is a perspective view of the in-floor utility outlet, with the access cover in place.
Figure 46:
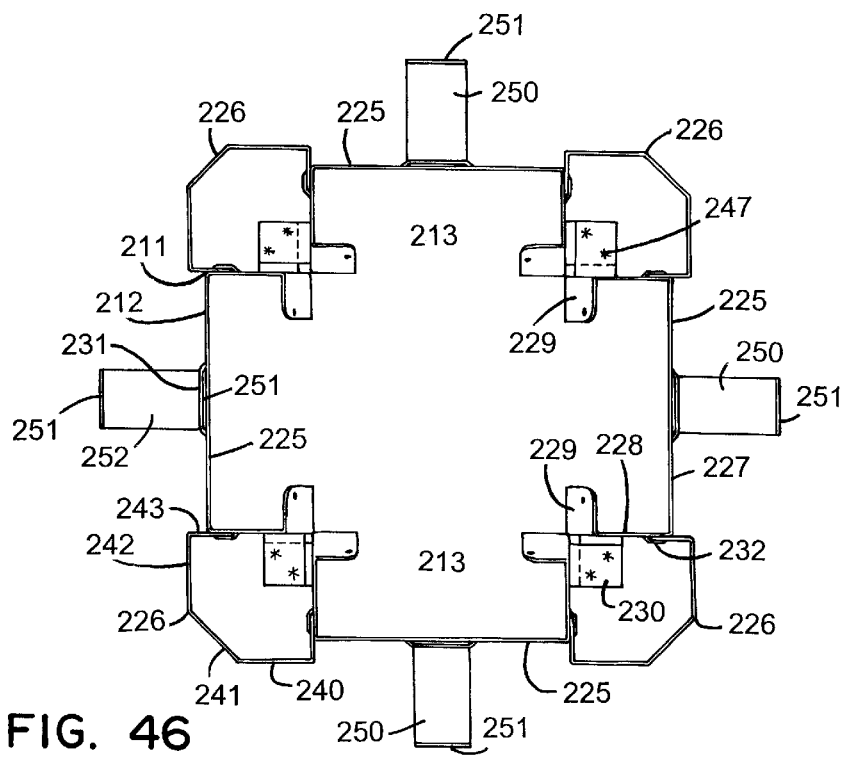
FIG. 46 is a top plan view of the in-floor utility outlet base.
Figure 47:
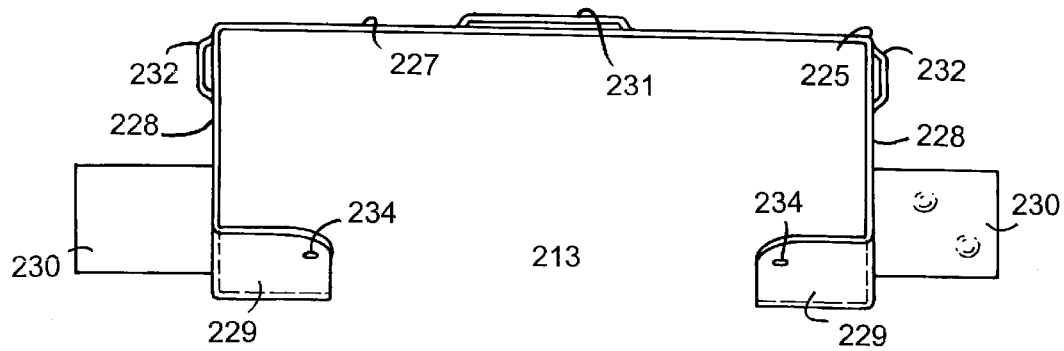
FIG. 47 is a top plan view of a box wall portion of the utility outlet base.
Figure 48:
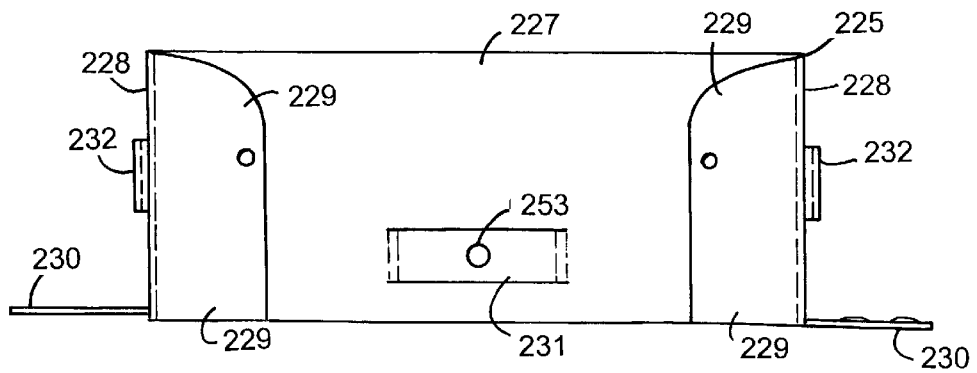
FIG. 48 is a front elevational view of the box wall.
Figure 49:
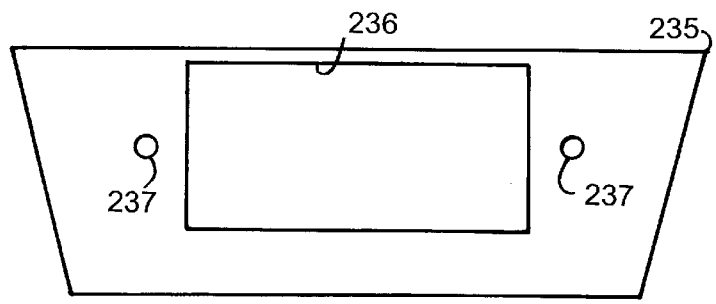
FIG. 49 is a front elevational view of a face plate associated with the utility outlet.
Figure 54:
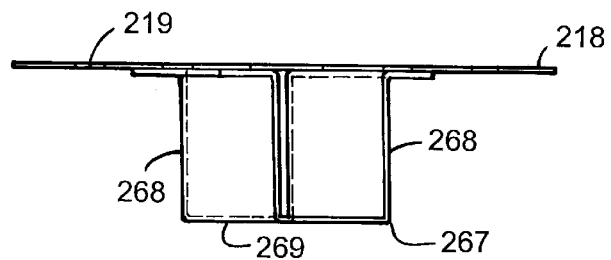
FIG. 54 is a side elevational view of the access cover.
Figure 52:
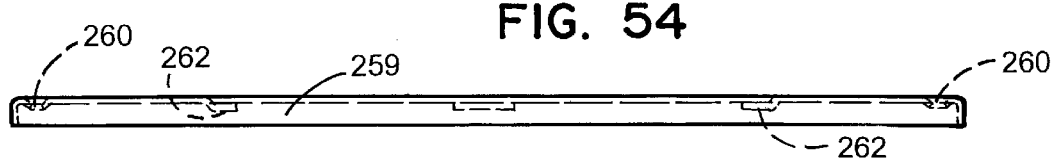
FIG. 52 is a side elevational view of the cover plate.
Figure 51:
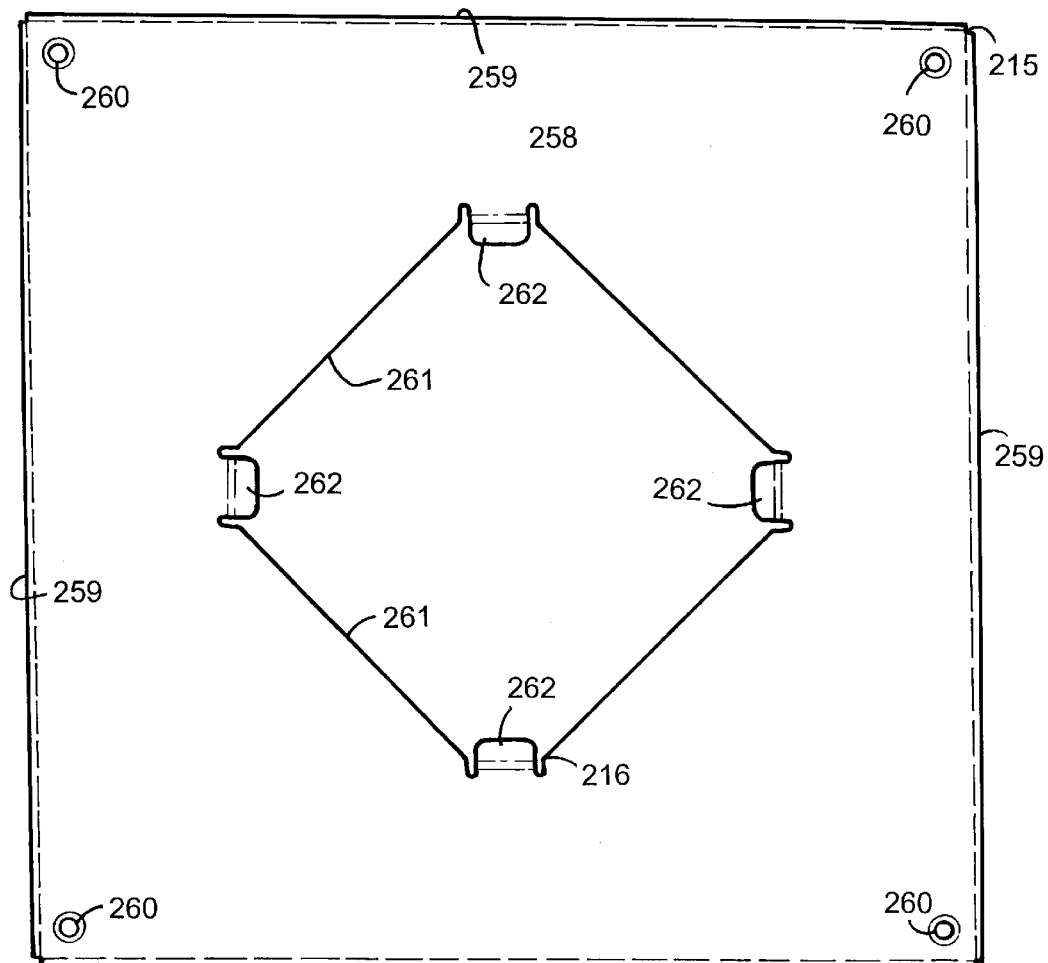
FIG. 51 is a top plan view of a cover plate portion of the in-floor utility outlet.

With reference to FIGS. 45 and 46, the sidewall 212 of in-floor utility outlet base 211 includes four box walls 225 and four corner walls 226, which are interconnected with a snap-together type of construction. The box walls 225 are substantially identical, and as best illustrated in FIGS. 47, 48 and 50, include a rear wall 227, a pair of opposite sidewalls 228, a pair of front flanges 229, and a pair of anchor tabs 230 which extend along and project outwardly from the bottom edges of sidewalls 228. Tab windows 3 and 232 are positioned in the rear and sidewalls 227 and 228 respectively, for purposes to be described in greater detailed hereinafter. A pair of knockout plugs 233 (FIG. 50) are located in the opposite sidewalls 228 to facilitate routing wires into the interior of box wall 225 for connection with utility outlets 214. The front flanges 229 define therebetween port 213, and include fastener apertures 234 therethrough for attachment of an associated face plate 235 (FIG. 49).

The illustrated face plate 235 (FIG. 49) has a trapezoidal front elevational configuration, with a centrally located, rectangular window 236 in which a utility outlet 214 is received, such as duplex power outlet. Face plate 235 is shaped to cover an associated port 213 in base sidewall 212, and includes fastener apertures 237 for attaching utility outlet 214 and face plate 235 to base flanges 229. It is to be understood that face plate 235 is preferably provided in a wide variety of different configurations to facilitate mounting various utility outlets, such as communication receptacles, duplex power outlets, etc. in the ports 213 of base 211.

Figure 55:
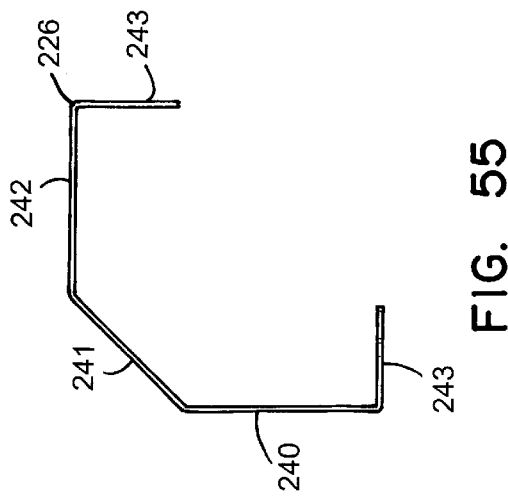
FIG. 55 is a top plan view of a corner wall portion of the utility outlet base.
Figure 57:
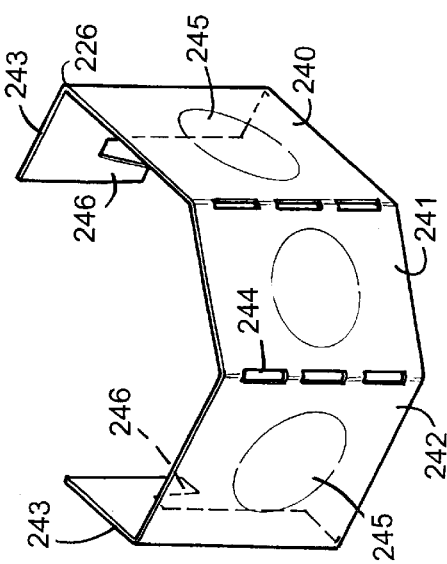
FIG. 57 is a perspective view of the corner wall.
Figure 53:
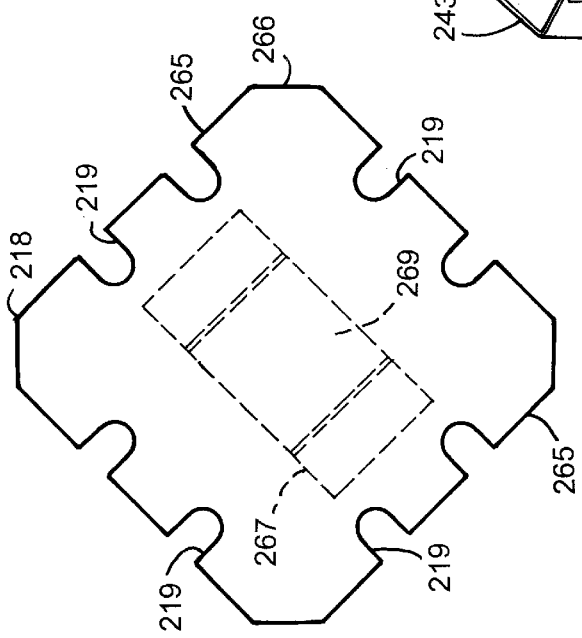
FIG. 53 is a top plan view of the access cover.
Figure 56:
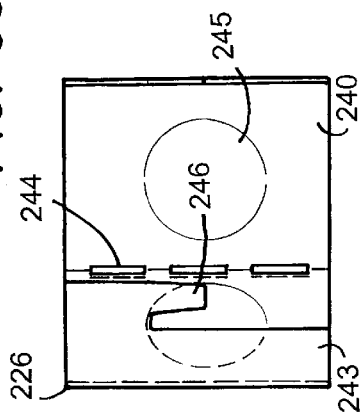
FIG. 56 is a side elevational view of the corner wall.

As best illustrated in FIGS. 55–57, the corner walls 226 of base sidewall 211 have a substantially identical construction, wherein each includes three horizontally oriented rear walls 240–242 and a pair of front flanges 243. Vertically stacked slots 244 are positioned through the adjacent edges of rear walls 240–242 to facilitate their formation, and knockout plugs 245 are positioned centrally in each of the rear walls 240–242 to route wires into and out of the interior of base side wall 212. Each of the front flanges 243 includes a downwardly oriented hook shaped tab 246, which is shaped to be closely received within the windows 232 of an associated box wall 225.

With reference to FIG. 46, the four box walls 225 and four corner walls 226 of base sidewall 212 are arranged in an alternating fashion, such that sidewall 212 has a generally square top plan configuration. The hook-shaped tabs 246 on each of the corner walls 226 are insert into the windows 232 of the adjacent box wall 225 to at least temporarily interconnect the same in a snap-together fashion. The anchor tabs 230 of adjacent box walls 225 overlap one another, and may be fixedly interconnected, such as by the illustrated spot welds 247 to form a rigid assembly. Four utility outlet ports 213 are positioned about the interior of base sidewall 212, and are arranged in an oppositely facing pattern, such that four separate utility outlets 214 can be mounted on a single in-floor utility outlet base 211 in the manner described in greater detail hereinafter. Consequently, in-floor outlet 210 can provide a relatively high number of different types of utility outlets 214 in a compact space below the surface of the raised floor construction 2.

U-shaped spacers 250 (FIGS. 45 and 46) are provided to center the in-floor utility outlet base 211 on an associated portion of the prefabricated floor construction, such as the illustrated alternate X-shaped floor pan 24a. Spacers 250 have a substantially identical construction, wherein each includes a pair of upstanding flanges 251 and the base web 252. The interior flange 251 is shaped to be closely received within the tab window 231 on the rear 227 of an associated box wall 225, and may be securely attached thereto by a fastener extending through the aperture 253 (FIG. 48) in window 231. The base web 252 of spacer 250 extends along the base 36a of X-shaped floor pan 24a, and the outer flange 251 abuts the interior sidewall 39a of an associated pedestal 38a. The illustrated in-floor utility outlet base 211 includes four spacers 250 extending from each of the box walls 225, so as to positively center the in-floor utility outlet base 211 on X-shaped floor pan 24a, in the manner illustrated in FIG. 45, without requiring physical interconnection therebetween, thereby creating a drop-in type of assembly.

The illustrated cover plate 215 (FIGS. 51 & 52) has a generally square shaped plan configuration, comprising a flat or planar upper plate portion 258 with four side flanges 259 depending from the marginal edges thereof. Four fastener apertures 260 are positioned at the corners of upper plate 258 and facilitate attachment of cover plate 215 to four pedestals 38a by suitable fasteners (not shown). The central aperture 216 of the illustrated cover plate 215 also has a generally square plan configuration, which is oriented opposite to the marginal edges of upper plate 258, such that they intersect at a 45° angle. Cover plate aperture 216 is defined by four edges 261 with downturned tabs 262 at each corner. Tabs 262 are configured to support access cover 218 thereon, such that the access cover is flush with the upper plate 258 of cover plate 215.

The illustrated access cover 218 (FIGS. 53 & 54) also has a substantially square plan configuration, comprising four side edges 265 having squared-off corners 266 and a plurality of U-shaped apertures 219 in the form of notches through which tap-in lines 220 can be routed. A hat-shaped bracket 267 is attached to the bottom surface of access cover 218, and includes opposite side flanges 268 and a base web 269 that is adapted to abut the base 36a of X-shaped floor pan 24a to provide additional support and prevent sagging or bowing. The squared-off corners 266 of access cover 218 are received on the support 262 of cover plate 215, and support access cover 218 in a generally flush condition with cover plate 215, to form a portion of the raised floor surface.

In operation, an in-floor utility outlet 210 can be easily installed in any of the floor pans 24–27, such as the illustrated X-shaped floor pan 24a. The cover plate 28 associated with floor pan 24a is first removed, so as to access the interior of the prefabricated floor construction. The base 211 of in-floor utility outlet 210 is then dropped-in on top of the base 36a of floor pan 24a, with the four spacers 250 arranged to abut the interior sidewalls 39a of the associated pan pedestals 38a to positively position base 211 centrally on floor pan 24a. Utility outlets 214, such as duplex power outlets, communication outlets, and the like are then selected for mounting in in-floor utility outlet 210. The selected utility outlets 214 are mounted on an associated face plate 235, and are attached to appropriate wiring which is routed through one or more of the knockout plugs 233 and 245 associated with base sidewall 212. Each face plate 235 is then attached to an associated port 213 in base sidewall 212 by means such as screws or the like. Cover plate 215 is then positioned on top of base sidewall 212 to enclose the utility lines 217 associated with the selected utility outlets 214. Tap-in lines 220 are then routed from associated furniture, appliances or the like and plugged into the selected utility outlets 214. Access cover 218 is then positioned in the central aperture 216 of cover plate 215, with the tap-in lines 220 being routed through the side notches 219.

Figure 58:
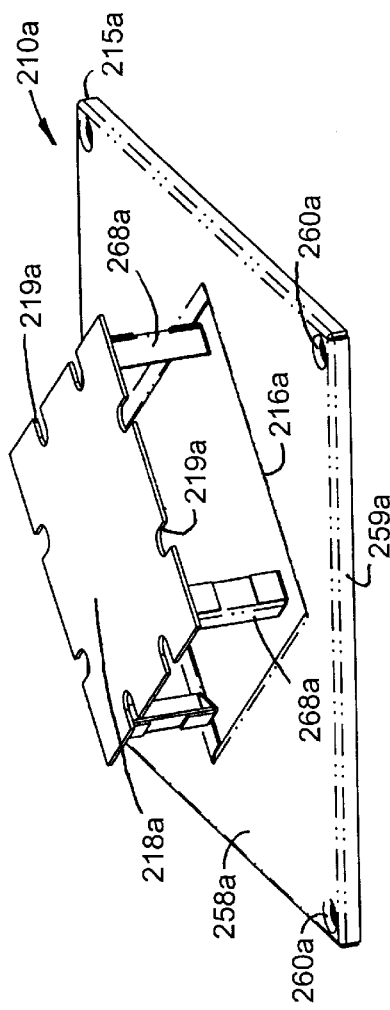
FIG. 58 is an exploded, perspective view of an alternate cover plate and access cover which embodies the present invention.
Figure 59:
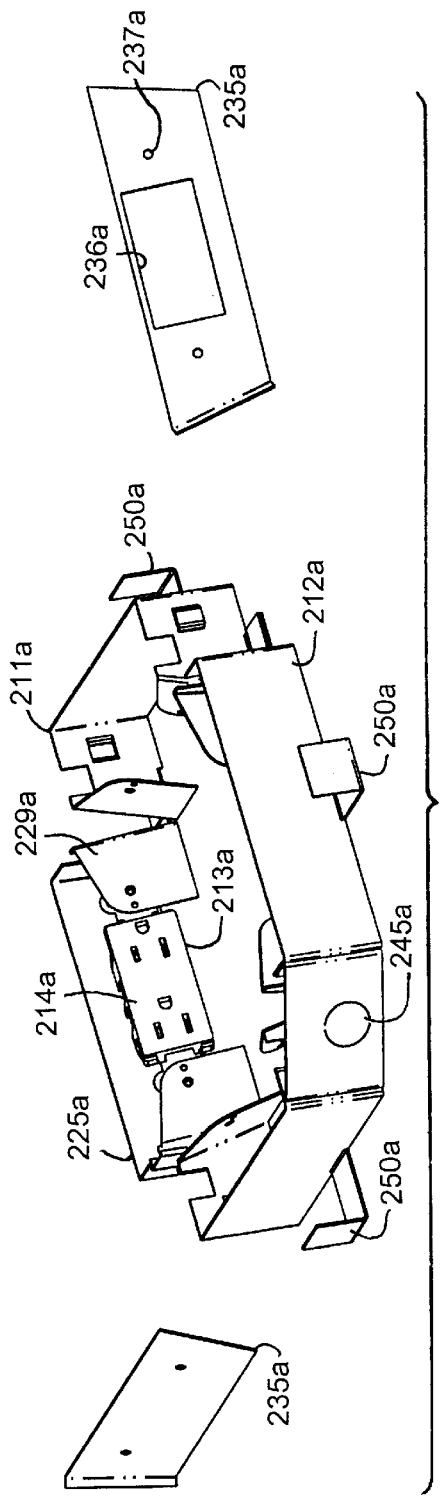
FIG. 59 is an exploded, perspective view of an alternate base embodying the present invention for use with the in-floor outlet shown in FIG. 58.

With reference to FIGS. 58 and 59, an alternative construction of in-floor utility outlet 210 is provided for enhanced wire handling capability. Since in-floor utility outlet 210a (FIGS. 58 & 59) is similar to the previously described in-floor utility outlet 210 (FIGS. 43–57), similar parts appearing in FIGS. 58–59 and 43–57 respectively are represented by the same, corresponding reference numeral, except for the suffix "a" in the numerals of the later. The cover in this embodiment includes integral corner supports which leave the center of the cavity free of obstruction. In addition, the cavity is slightly larger than the previously disclosed embodiment and the geometry of permanently attached spacers and other components are adjusted dimensionally. Notches in the corner transition cavity allow for wiring between ports.

With reference to FIGS. 60–65, yet another embodiment of an in-floor utility outlet generally designated at 300 is provided as a one-piece base unit for simplified construction. Referring to FIGS. 62–64, in its preferred embodiment in-floor utility outlet 300 is formed from sheet metal blank 302 wherein blank 302 has along its length an alternating series of sidewall segments 310 and sidewall segments 312. Segments 310 and 312 are separated by bend reliefs 318. End tabs 314 and 316 are located at each end of blank 302 and replace one of sidewall segments 312. Each of sidewall segments 310 have extending therefrom a spacer leg 308 flanked by frame legs 304 and 306.

The initial forming of blank 302 into an in-floor outlet 300 is accomplished by bending spacer legs 308 at a right angle to sidewall segment 310 and frame legs 304 and 306 at an opposing right angle to sidewall segment 310. Additional forming of each leg is depicted in FIG. 64. The general final plan configuration of in-floor outlet 300 is that of an octagon. End tab 316 is formed at approximately a 135° angle with respect to adjacent sidewall segment 310. The final formation of blank 302 into in-floor outlet 300 is accomplished by bending sidewall segments 310 and 312 with respect to each other along bend reliefs 318 to form a generally closed plan shape. After forming, holes 315 of end tab 314 are aligned with holes 317 of end tab 316 and may be affixed by fasteners or spot welding. Each of frame legs 304 have in an upper edge thereof a notch 303 and each of frame legs 306 have at a left side thereof a tab 307 such that when blank 302 is formed in its generally closed plan shape, tab 307 become engaged in slots 303 as shown in FIG. 61.

Figure 61:
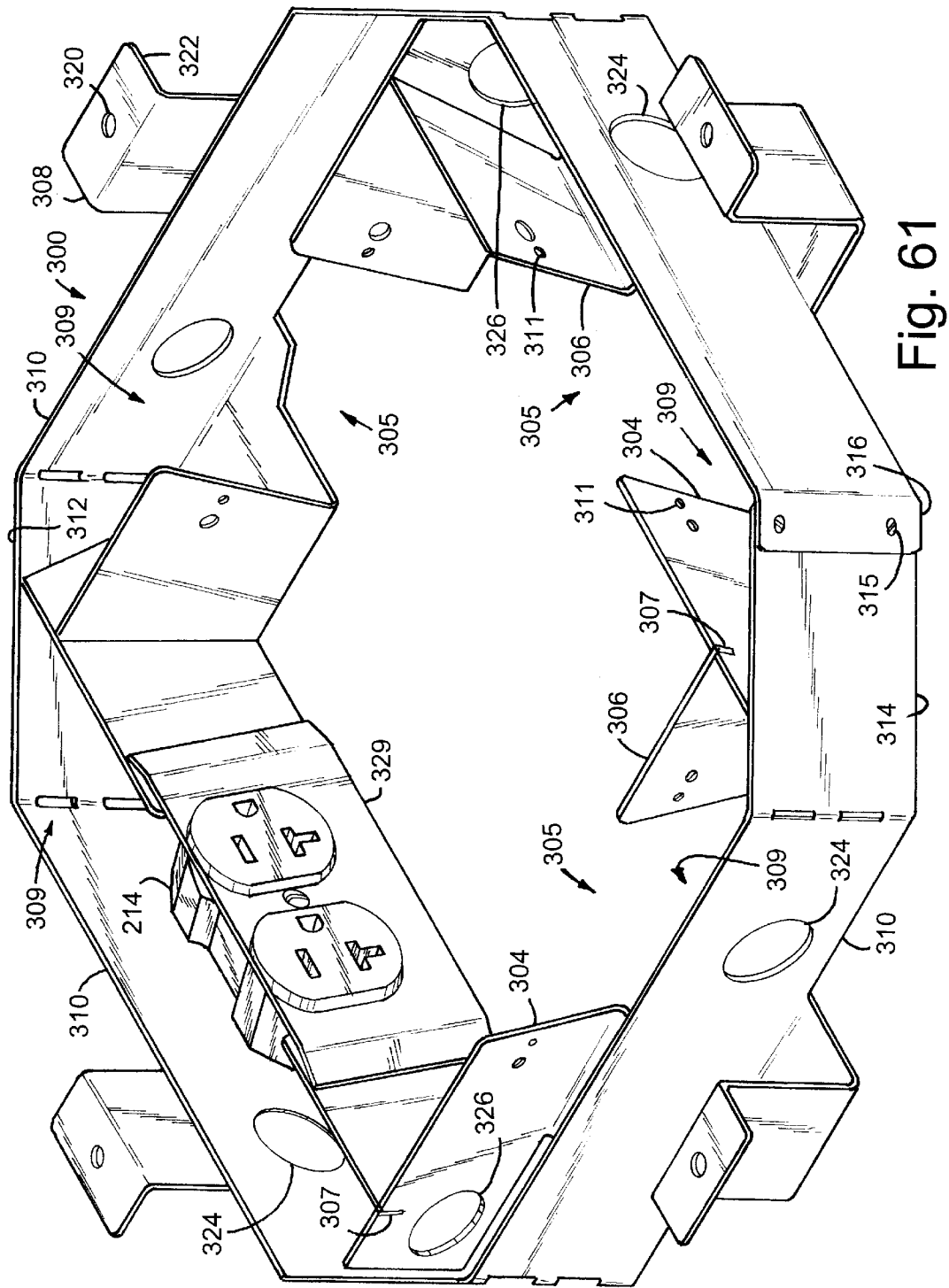
FIG. 61 is a perspective view of a one-piece in-floor outlet embodying the present invention.

FIG. 61 illustrates the completely formed in-floor utility outlet 300 wherein spacer legs 308 are positioned at substantially 90° intervals about outlet 300 and have at an upper end thereof a horizontal mount tab 322 having a hole 320 therethrough for the attachment of in-floor utility outlet 300 to a raised floor system as described below. Each of formed frame legs 304 and 306 combine to form a mount frame defining port 305 for receiving utility outlet 214. Utility outlet 214 is affixed within port 305 by fastening duplex 328 to holes 311. After final formation of in-floor utility outlet 300, frame legs 304 and 306 cooperate with sidewall segment 310 and adjacent sidewall segments 312 to form cavity 309. In the preferred embodiment, four cavities 309 are formed about the periphery of in-floor utility outlet 300. A facia plate 329 can be added to fully cover utility outlet 214 and further isolate cavities 309 from the central portion of in-floor utility outlet 300.

Each of frame legs 304 and 306 are shaped such that upon final formation of outlet 300 each cavity 309 is isolated from an adjacent cavity 309. Adjacent cavities 309 are isolated one from the other so that different types of office utilities may be routed therein. Office utilities are routed to an interior of cavities 309 from an area exterior of outlet 300 through feed-through apertures 324. Additional feed-through apertures 326 are provided in legs 304 in the event office utilities are desired to be routed to an adjacent cavity 309.

Figure 60:
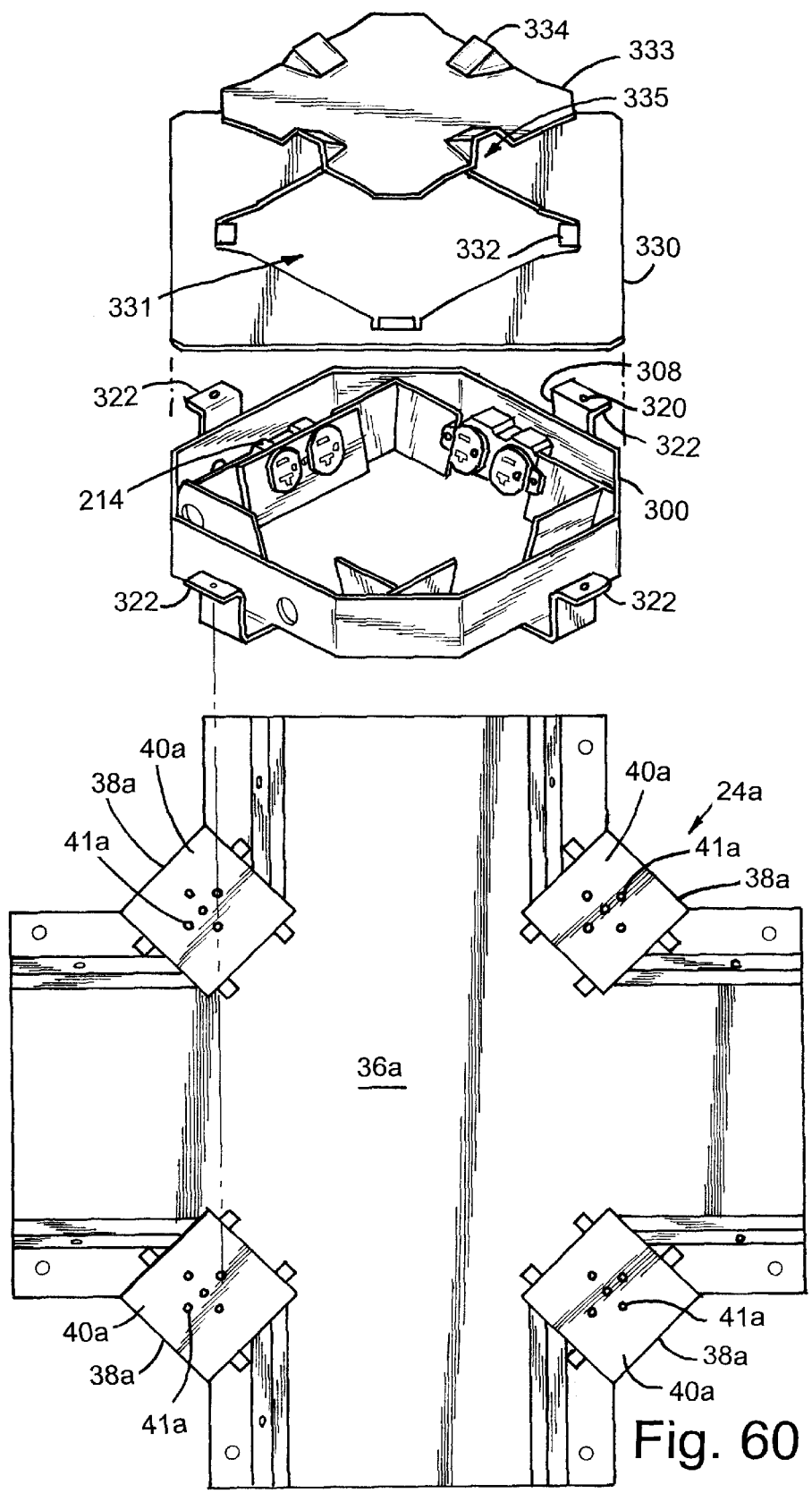
FIG. 60 is an exploded perspective view of a one-piece in-floor outlet, cover plate, and floor pan.

Referring to FIG. 60, a completed in-floor outlet 300 is installed on X-floor pan 24a wherein spacer mount tabs 322 of spacer legs 308 rest upon pad 40a of pedestals 38a on floor pan 24a. Holes 320 are aligned with interior holes 41a of pedestals 38a and in-floor outlet 300 rests upon X-pan base 36a.

Figure 65:
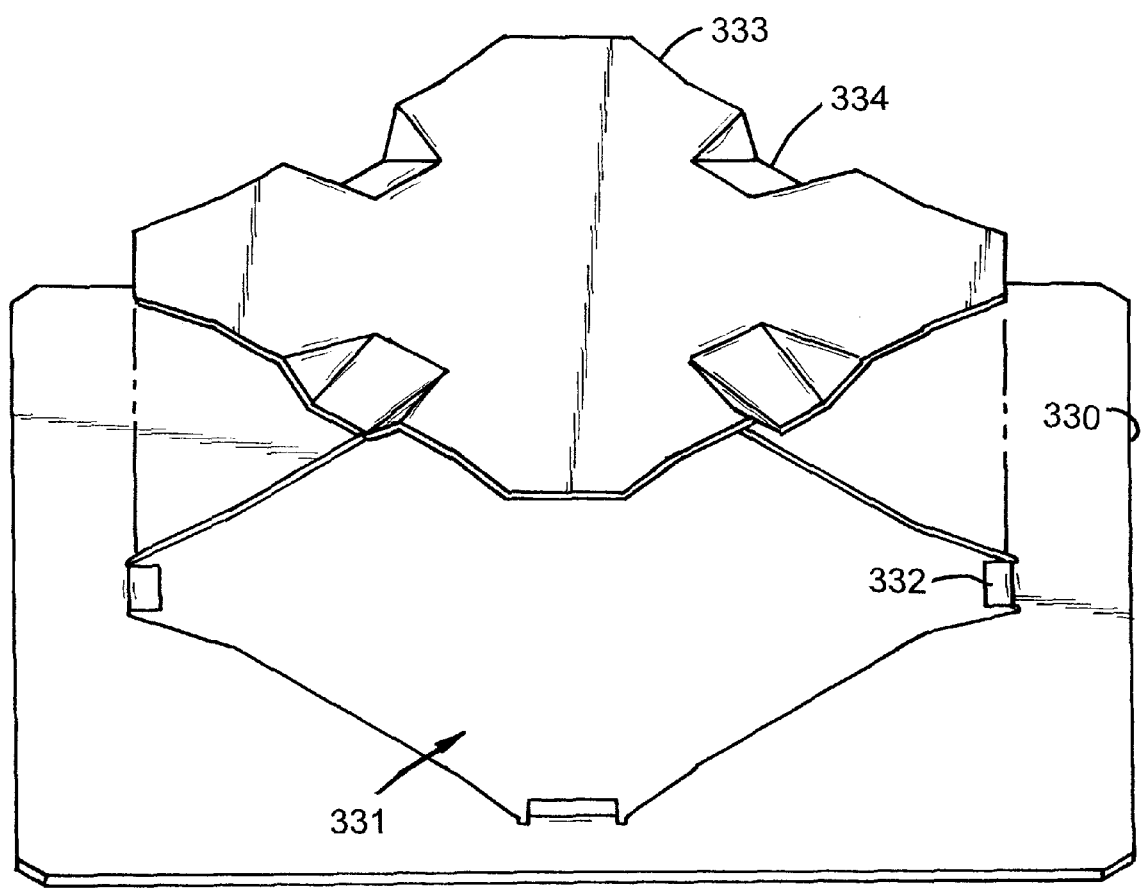
FIG. 65 is an exploded view of an inverted access cover in relation to a cover plate.

Cover plate 330 is supported at its corners by pedestals 38a. Cover plate 330 has a central aperture 331 which, in the preferred embodiment, has generally square plan form and wherein support tabs 332 are positioned at the corners thereof for supporting an access cover 333. Access cover 333 conforms in shape to central aperture 331 to fit therein and is supported by support tabs 332. Access cover 333 has around a marginal edge thereof a plurality of apertures 335 through which utility cords may be routed for access to utility outlets 214. Apertures 335 are defined by a hood 334 formed at the marginal edge of access cover 333. Access cover 333 is placed upon cover plate 333 such that hoods 334 extend vertically upward thereby permitting utility cords of office appliances to be routed through apertures 335. When in-floor utility outlet 300 is not in use, access cover 333 may be inverted such that hoods 334 project downward into the central portion of outlet 300 thereby presenting an unobstructed floor surface, as shown in FIG. 65.

Utility distribution system 1 is quite versatile, and provides not only a unique prefabricated floor construction 2 which is adapted to physically separate different types of utility conduits to avoid interference, but also a novel utility post 9 which permits the distribution of utilities from the floor construction 2 at various locations throughout the system. In-floor utility outlets 210 and 300 can be readily installed anywhere throughout floor construction 2, and provides a convenient, compact tap for various types of different utilities. In-floor outlets 210 and 300 can also be readily relocated without substantial disassembly of floor construction 2. The utility outlets 214 are positioned safely below the raised floor surface, and are generally non-obtrusive to the planned esthetics of the space. Utility distribution system 1 is very efficient, and quite adaptable to effectively support a wide variety of different furniture systems and configurations.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a raised floor construction of the type having an elevated floor surface below which utilities can be routed, the improvement of an in-floor utility outlet therefor, comprising:

a base positioned in said raised floor construction generally below the floor surface; said base having a sidewall with an open top and generally closed plan shape, and at least one port shaped to mount an associated utility outlet therein;

a cover plate mounted on said raised floor construction, and forming a portion of the floor surface; said cover plate including a central aperture therethrough, and extending over said base sidewall to enclose utility lines associated with the utility outlet;

an access cover received in the central aperture of said cover plate, and retained in a generally flush orientation with said cover plate to form a portion of the floor surface; said access cover including at least one aperture through which utility tap-in lines can be routed below the floor surface for connection with the utility outlet; and at least one irregularly shaped floor pan having a central portion and at least one leg extending therefrom for abutting to another like floor pan and supported on a building support surface below said raised floor surface, said floor pan further having a central plate receiving said base thereon, and upstanding pedestals supporting said cover plate thereon.

2. A raised floor construction as set forth in claim 1, wherein:

said base includes a plurality of said ports arranged in an oppositely facing orientation to mount multiple utility outlets therein.

3. A raised floor construction as set forth in claim 2, wherein:

said access cover includes a plurality of said apertures positioned along a marginal edge of said access cover through which multiple utility tap-in lines can be routed.

4. A raised floor construction as set forth in claim 3, wherein:

said base includes outwardly extending spacers which position said base centrally on said floor pan.

5. A raised floor construction as set forth in claim 1, wherein:

said access cover includes a vertical support having an upper end thereof attached to a central portion of said access cover, and a lower end thereof abutting the central plate of said floor pan.

6. A raised floor construction as set forth in claim 5, wherein:

said base includes outwardly extending spacers which position said base centrally in said floor pan.

7. A raised floor construction as set forth in claim 6, wherein:

said spacers have outer ends thereof abutting said pedestals to positively position said base centrally on said floor pan.

8. A raised floor construction as set forth in claim 1, wherein:

said cover plate has a generally square top plan shape.

9. A raised floor construction as set forth in claim 1, wherein:

said central aperture in said cover plate has a generally square top plan shape.

10. In a raised floor construction of the type having an elevated floor surface below which utilities can be routed, the improvement of an in-floor utility outlet therefor, comprising:

a base positioned in said raised floor construction generally below the floor surface; said base having a sidewall with a generally closed plan shape and a plurality of ports arranged in an oppositely facing orientation to mount multiple utility outlets therein, and further including outwardly extending spacers which position said base centrally on said floor pan;

a cover plate mounted on said raised floor construction, and forming a portion of the floor surface; said cover plate including a central aperture therethrough, and extending over said base sidewall to enclose utility lines associated with the utility outlet;

an access cover received in the central aperture of said cover plate, and retained in a generally flush orientation with said cover plate to form a portion of the floor surface; said access cover including a plurality of said apertures positioned along a marginal edge of said access cover through which multiple utility tap-in lines can be routed below the floor surface for connection with the utility outlet;

at least one floor pan supported on a building support surface below said raised floor surface, and having a central plate receiving said base thereon, and upstanding pedestals supporting said cover plate thereon; and wherein:

said spacers have outer ends thereof abutting said pedestals to positively position said base centrally on said floor pan.

11. A raised floor construction as set forth in claim 10, wherein:

said access cover includes a vertical support having an upper end thereof attached to a central portion of said access cover, and a lower end thereof abutting the central plate of said floor pan.

12. A raised floor construction as set forth in claim 10, wherein:

said cover plate has a generally square top plan shape.

13. A raised floor construction as set forth in claim 12, wherein:

said central aperture in said cover plate has a generally square top plan shape.

14. A raised floor construction as set forth in claim 10, wherein:

said base sidewall has a generally cruciform top plan configuration, with four oppositely facing sidewall portions.

15. A raised floor construction as set forth in claim 14, wherein:

said base sidewall has one of said ports in each of said sidewall portions.

16. A raised floor construction as set forth in claim 15, wherein:

said base has a modular construction.

17. In a raised floor construction of the type having an elevated floor surface below which utilities can be routed, the improvement of an in-floor utility outlet therefor, comprising:

a base positioned in said raised floor construction generally below the floor surface; said base having a sidewall with a generally closed plan shape and a generally cruciform top plan configuration, with four oppositely facing sidewall portions, and at least one port shaped to mount an associated utility outlet therein;

a cover plate mounted on said raised floor construction, and forming a portion of the floor surface; said cover plate including a central aperture therethrough, and extending over said base sidewall to enclose utility lines associated with the utility outlet;

an access cover received in the central aperture of said cover plate, and retained in a generally flush orientation with said cover plate to form a portion of the floor surface; said access cover including at least one aperture through which utility tap-in lines can be routed below the floor surface for connection with the utility outlet; and at least one floor pan supported on a building support surface below said raised floor surface, and having a central plate receiving said base thereon, and upstanding pedestals supporting said cover plate thereon.

18. A raised floor construction as set forth in claim 17, wherein:

said base sidewall has one said port in each of said sidewall portions.

19. An in-floor utility outlet for raised floor constructions of the type having an elevated floor surface below which utilities can be routed, comprising:

a base having a sidewall with a generally closed plan shape, and at least one port shaped to mount an associated utility outlet therein, said base sidewall having a generally cruciform top plan configuration, with four oppositely facing sidewall portions;

a cover plate having a closed marginal portion with a central aperture therethrough, and a marginal portion extending over said base sidewall to enclose utility lines associated with the utility outlet; and an access cover received in the central aperture of said cover plate, and retained in a generally flush orientation with said cover plate to form a portion of the floor surface; said access cover including at least one aperture through which utility tap-in lines can be routed below the floor surface for connection with the utility outlets.

20. An in-floor utility outlet as set forth in claim 19, wherein:

said base includes a plurality of said ports arranged in an oppositely facing orientation to mount multiple utility outlets therein.

21. An in-floor utility outlet as set forth in claim 20, wherein:

said access cover includes a plurality of said apertures positioned along a marginal edge of said access cover through which multiple utility tap-in lines can be routed.

22. An in-floor utility outlet as set forth in claim 21, wherein:

said base includes outwardly extending spacers which position said base relative to an associated raised floor construction.

23. An in-floor utility outlet as set forth in claim 22, wherein:

said cover plate has a generally square top plan shape.

24. An in-floor utility outlet as set forth in claim 23, wherein:

said central aperture in said cover plate has a generally square top plan shape.

25. An in-floor utility outlet as set forth in claim 24, wherein:

said base sidewall has one said port in each of said sidewall portions.

26. An in-floor utility outlet as set forth in claim 25, wherein:

said access cover includes a vertical support having an upper end thereof attached to a central portion of said access cover, and a lower end thereof adapted to abut a supporting surface.

27. An in-floor utility outlet as set forth in claim 19 wherein:

said base is formed from a single sheet of formable material.

28. An in-floor utility outlet as set forth in claim 19 wherein:

said base is formed from a plurality of pieces of formable material.

29. An in-floor utility outlet for raised floor constructions of the type having an elevated floor surface below which utilities can be routed, comprising:

a one-piece base having a sidewall with a generally closed plan shape, and at least one frame formed therefrom to mount an associated utility outlet therein;

a cover plate having a closed marginal portion with a central aperture therethrough, and a marginal portion extending over said base sidewall to enclose utility lines associated with the utility outlet; and an access cover received in the central aperture of said cover plate, and retained in a generally flush orientation with said cover plate to form a portion of the floor surface; said access cover including at least one aperture through which utility tap-in lines can be routed below the floor surface for connection with the utility outlet.

30. An in-floor utility outlet as set forth in claim 29, wherein:

said one-piece base includes a plurality of said frames formed from said base and arranged in an oppositely facing orientation to mount multiple utility outlets therein.

31. An in-floor utility outlet as set forth in claim 30, wherein:

said one-piece base includes outwardly extending spacers which position said base relative to an associated raised floor construction.

32. An in-floor utility outlet as set forth in claim 31, wherein:

said access cover includes a plurality of said apertures positioned along a marginal edge of said access cover through which multiple utility tap-in lines can be routed.

33. An in-floor utility outlet as set forth in claim 29, wherein:

said base is formed from a single sheet of formable material.

34. An in-floor utility outlet as set forth in claim 33, wherein:

said sidewall portion of said base has a plurality of legs extending therefrom wherein at least a first portion of said legs forms said frame.

35. An in-floor utility outlet as set forth in claim 34, wherein:

said first portion of said legs form a plurality of said frames.

36. An in-floor utility outlet as set forth in claim 35, wherein:

each of said frames interconnects with an adjacent one of said frames within said closed plan shape to isolate utilities associated with said each of said frames from the utilities associated with said adjacent one of said frames.

37. An in-floor utility outlet as set forth in claim 36, wherein: a second portion of said legs form said outwardly extending spacers.

38. An in-floor utility outlet for raised floor constructions of the type having an elevated floor surface below which utilities can be routed, comprising:

a one-piece base having a sidewall with a generally closed plan shape and outwardly extending spacers which position said base relative to an associated raised floor construction, and further including a plurality of said frames formed from said base and arranged in an oppositely facing orientation to mount multiple utility outlets therein;

a cover plate having a closed marginal portion with a central aperture therethrough, and a marginal portion extending over said base sidewall to enclose utility lines associated with the utility outlet; and an access cover received in the central aperture of said cover plate, and retained in a generally flush orientation with said cover plate to form a portion of the floor surface; said access cover including a plurality of apertures positioned along a marginal edge of said access cover through which multiple utility tap-in lines can be routed below the floor surface for connection with the utility outlet wherein each of said apertures positioned along a marginal edge of said access cover is defined by a hood formed at a marginal edge of said cover, said hood extending above a surface of said access cover.

39. An in-floor utility outlet as set forth in claim 38, wherein:

said cover plate has a generally square top plan shape.

40. An in-floor utility outlet as set forth in claim 39, wherein:

said central aperture in said cover plate has a generally square top plan shape.

41. An in-floor utility outlet as set forth in claim 40, wherein:

said base sidewall has one said frame formed from each of said sidewall portions.

42. An in-floor utility outlet as set forth in claim 41, wherein:

said access cover includes a vertical support having an upper end thereof attached to a central portion of said access cover, and a lower end thereof adapted to abut a supporting surface.

* * * * *

UNITED STATES PATENT AND TRADEMARK OFFICE
CERTIFICATE OF CORRECTION

PATENT NO. : 5,943,833
DATED : August 31, 1999
INVENTOR(S) : Thomas G. Feldpausch et al.

It is certified that error appears in the above-identified patent and that said Letters Patent is hereby corrected as shown below:

Col. 6, line 27;

"on top a" should be --on top of a--;

Col. 8, line 4;

"si all" should be --sidewall--;

Col. 8, line 6;

"pedestal 69" should be --pedestal 67--;

Col. 8, line 27;

"comer" should be --corner--;

Col. 9, line 23;

"comer" should be --corner--;

Col. 11, line 53;

"comer" should be --corner--;

Col. 14, line 26;

"later" should be --latter--;

UNITED STATES PATENT AND TRADEMARK OFFICE
CERTIFICATE OF CORRECTION

PATENT NO. : 5,943,833
DATED : August 31, 1999
INVENTOR(S) : Thomas G. Feldpausch et al.

It is certified that error appears in the above-identified patent and that said Letters Patent is hereby corrected as shown below:

Col. 15, line 19;

"Tab windows 3 and 232" should be --tab windows 231 and 232--;

Col. 15, line 21;

"detailed" should be --detail--.

Col. 15, line 57;

"insert" should be --inserted--;

Col. 16, line 27;

"comers" should be --corners--;

Col. 16, line 40;

"comers" should be --corners--;

Col. 17, line 16;

"later" should be --latter--;

Col. 17, line 53;

"become" should be --becomes--;

UNITED STATES PATENT AND TRADEMARK OFFICE
CERTIFICATE OF CORRECTION

PATENT NO. : 5,943,833
DATED : August 31, 1999
INVENTOR(S) : Thomas G. Feldpausch et al.

It is certified that error appears in the above-identified patent and that said Letters Patent is hereby corrected as shown below:

Col. 20, claim 12, line 36;
"claim 10" should be --claim 11--;

Col. 20, claim 14, line 43;
"claim 10" should be --claim 11--;

Col. 22, claim 35, line 59;
"form" should be --forms--;

Col. 23, claim 37, line 2;
"form" should be --forms--.

Signed and Sealed this

Ninth Day of May, 2000

Q. TODD DICKINSON

*Attest:*

*Attesting Officer*     *Director of Patents and Trademarks*